United States Patent
Zhao et al.

(10) Patent No.: US 10,033,982 B2
(45) Date of Patent: Jul. 24, 2018

(54) METHOD AND DEVICE FOR DECODING AND ENCODING SUPPLEMENTAL AUXILIARY INFORMATION OF THREE-DIMENSIONAL VIDEO SEQUENCE

(71) Applicants: ZTE CORPORATION, Shenzhen, Guangdong Province (CN); Zhejiang University, Zhejiang (CN)

(72) Inventors: Yin Zhao, Shenzhen (CN); Lu Yu, Shenzhen (CN); Yingjie Hong, Shenzhen (CN); Ming Li, Shenzhen (CN)

(73) Assignees: ZTE CORPORATION, Shenzhen, Guangdong Province (CN); ZHEJIANG UNIVERSITY, Zhejiang (CN)

( * ) Notice: Subject to any disclaimer, the term of this patent is extended or adjusted under 35 U.S.C. 154(b) by 472 days.

(21) Appl. No.: 14/397,158

(22) PCT Filed: Apr. 24, 2013

(86) PCT No.: PCT/CN2013/074643
§ 371 (c)(1),
(2) Date: Oct. 24, 2014

(87) PCT Pub. No.: WO2013/159702
PCT Pub. Date: Oct. 31, 2013

(65) Prior Publication Data
US 2015/0117547 A1 Apr. 30, 2015

(30) Foreign Application Priority Data

Apr. 25, 2012 (CN) .......................... 2012 1 0124988
Nov. 2, 2012 (CN) .......................... 2012 1 0433288

(51) Int. Cl.
H04N 13/00 (2018.01)
G06K 9/00 (2006.01)
(Continued)

(52) U.S. Cl.
CPC ..... H04N 13/0048 (2013.01); H04N 13/0011 (2013.01); H04N 13/0062 (2013.01);
(Continued)

(58) Field of Classification Search
USPC ........................................................ 375/240
See application file for complete search history.

(56) References Cited

U.S. PATENT DOCUMENTS 8,358,331 B2 * 1/2013 Suh .................... H04N 13/0059
348/42
8,896,664 B2 * 11/2014 Lee .................... H04N 13/0048
348/42
(Continued)

FOREIGN PATENT DOCUMENTS

CN 102158733 A 8/2011
CN 102325254 A 1/2012
(Continued)

OTHER PUBLICATIONS

International Search Report (Form PCT/ISA/210) for PCT/CN2013/074643 dated Aug. 8, 2013.
(Continued)

*Primary Examiner* — Jorge L Ortiz Criado
*Assistant Examiner* — Susan E. Hodges
(74) *Attorney, Agent, or Firm* — Koppel, Patrick, Heybl & Philpott

(57) ABSTRACT

Provided are a method and device for decoding and encoding supplemental auxiliary information of a three-dimensional video sequence. The method includes: obtaining supplemental auxiliary information for constructing a ste-
(Continued)

Encode supplemental auxiliary information as an supplemental auxiliary information bitstream — S302

Write the supplemental auxiliary information bitstream in a three-dimensional video sequence bitstream — S304 reo-pair from a three-dimensional video sequence bitstream, the supplemental auxiliary information being used for indicating that the stereo-pair is constructed from a reconstructed three-dimensional video sequence, and the reconstructed three-dimensional video sequence being obtained by decoding the three-dimensional video sequence bitstream. The present invention solves the technical problem in the prior art that degraded displaying quality of a constructed stereo-pair appears because of the lack of supplemental auxiliary information in a three-dimensional video sequence bitstream, and achieves the technical effect of improving the display quality of a constructed stereoscopic video.

28 Claims, 3 Drawing Sheets

(51) Int. Cl.
  *H04N 21/23* (2011.01)
  *H04N 21/2362* (2011.01)
  *H04N 21/434* (2011.01)
  *H04N 21/81* (2011.01)
  *H04N 21/235* (2011.01)
(52) U.S. Cl.
  CPC ..... *H04N 13/0066* (2013.01); *H04N 21/2353* (2013.01); *H04N 21/2362* (2013.01); *H04N 21/4345* (2013.01); *H04N 21/816* (2013.01)

(56) References Cited

U.S. PATENT DOCUMENTS

| | | | |
|---|---|---|---|
| 2008/0285863 A1* | 11/2008 | Moon | H04N 13/0048 382/232 |
| 2010/0020884 A1* | 1/2010 | Pandit | H04N 19/597 375/240.25 |
| 2012/0036544 A1* | 2/2012 | Chen | H04N 19/597 725/109 |
| 2012/0069146 A1 | 3/2012 | Lee et al. | |
| 2013/0141535 A1* | 6/2013 | Hattori | H04N 13/0048 348/43 |
| 2013/0142247 A1 | 6/2013 | Hattori et al. | |
| 2013/0314498 A1 | 11/2013 | Hui et al. | |

FOREIGN PATENT DOCUMENTS

| | | |
|---|---|---|
| CN | 102724520 A | 10/2012 |
| JP | 2005006114 A | 1/2005 |
| JP | 2008259171 A | 10/2007 |
| JP | 2009004939 A | 1/2009 |
| JP | 2010063067 A | 3/2010 |
| JP | 2011109397 A | 6/2011 |
| JP | 201101924 A | 7/2011 |
| WO | WO2012029883 A1 | 3/2012 |
| WO | WO2012029884 A1 | 3/2012 |

OTHER PUBLICATIONS

European Search Report from corresponding European Patent Appl. No. 1378167537, dated Apr. 23, 2015.

First Office Action from corresponding Japanese Patent Appl, No. 2015-507354, dated Mar. 1, 2016.

Second Office Action from corresponding Japanese Patent Appl. No. 2015-507354, dated Nov. 8, 2016.

* cited by examiner

METHOD AND DEVICE FOR DECODING AND ENCODING SUPPLEMENTAL AUXILIARY INFORMATION OF THREE-DIMENSIONAL VIDEO SEQUENCE

TECHNICAL FIELD

The present invention relates to the field of communications, and in particular to a method and device for decoding and encoding supplemental auxiliary information of a three-dimensional video sequence.

BACKGROUND ART

A three-dimensional video (3D video) sequence comprises a multi-view (usually at least 2 views) video sequence (corresponding to texture information) and corresponding depth sequences (corresponding to depth information), usually also known as an MVD (multi-view video plus depth) format. View synthesis technology can be used to generate one or more synthesized video sequences using a three-dimensional sequence. A traditional binocular stereoscopic video is composed of a video sequence of two fixed views (i.e. a left view and a right view), and is also called as a stereo-pair. A stereo-pair obtained by a binocular camera may have the problem that the parallax of two views is too large. Viewing such a stereo-pair may cause a relatively severe visual fatigue, or such a stereo-pair is not suitable for binocular stereoscopic viewing. By introducing a synthesized video sequence of a virtual view, a video sequence in the stereo-pair and the synthesized video sequence may be used to constitute a stereo-pair which is more suitable for binocular stereoscopic viewing, and here it is referred to as a stereo-pair.

The virtual view video sequence is generated by using view synthesis technology, and the so-called view synthesis mainly uses depth-image-based rendering (DIBR for short) technology, that is, samples of a camera view image is projected onto another virtual view by means of a corresponding depth value thereof and corresponding camera parameters, thereby generating a projected image; and then, after processing of hole filling, filtering, resampling, etc., a virtual view video sequence finally being used for displaying is generated. Projection in view synthesis may use full-pixel precision, i.e. the resolutions of the projected image and the camera view image are the same, and may also use sub-pixel precision of 1/N (N being a positive integer), i.e. the resolution in a horizontal direction of the projected image is N times of that of the camera view image, where N is usually a multiple of 2. Generally, using the sub-pixel projection precision may obtain a virtual view video sequence with a better quality than that of using the full-pixel projection precision, but the calculation complexity is also higher.

The three-dimensional video sequence contains several access units, one access unit comprising pictures (corresponding to texture information) at a certain moment and corresponding depths thereof (corresponding to depth information) of a plurality of (two or more than two) views. The three-dimensional video sequence is encoded to form a three-dimensional video bitstream, and the so-called bitstream is composed of a plurality of binary bits. The encoding method may be an encoding method based on video coding standards of MPEG-2, H.264/AVC, HEVC, AVS, VC-1, etc. It needs to be noted that the video coding standard specifies the syntax of bitstreams and a decoding method for a bitstream conforming to the standard, but does not specify an encoding method for generating the bitstream. However, the applied encoding method must be matched with the decoding method specified by the standard and form a bitstream conforming to the standard, such that a decoder can decode the bitstream correctly, otherwise the decoding process may collapse with errors. The picture obtained by decoding is called a decoded picture or a reconstructed picture.

The video coding standard also specifies syntax units which are not mandatory in terms of decoding a video picture, which, however, may indicate how to render the decoded pictures, or how to assist video decoding, etc. These syntax units are, for example, supplemental enhancement information (SEI, see H.264/AVC standard document) in H.264/AVC standard, video usability information (VUI, see H.264/AVC standard document), MVC VUI parameters extension (see H.264/AVC standard document) in subset sequence parameter set (subset SPS, see H.264/AVC standard document). Syntax units with similar functions in other video coding standards are also included. One syntax unit is a segment of bitstream, containing a group of syntax elements, and these syntax elements are arranged according to the order specified in a video coding standard. Code words corresponding to the syntax elements are connected to form a bitstream.

In order to support virtual view synthesis, the three-dimensional video sequence bitstream may also comprise camera parameter information about various views, e.g. focal length, coordinate location of a view, etc. Generally, various views of the three-dimensional video sequence correspond to a parallel camera arrangement structure (e.g. a test sequence applied by a MPEG 3DV group), that is, the optical axes of all the views are parallel to each other and the optical centres are arranged on one straight line.

The SEI of H.264/AVC is constituted by a plurality of SEI messages. Each SEI message has a type serial number (i.e. payloadType) and bitstream length (i.e. payloadSize). The bitstream of an SEI message comprises a payloadType coded in 8 bits of unsigned integer codes, a payloadSize coded in 8 bits of unsigned integer codes, and a message content bitstream with a length of several bytes (1 byte=8 bits) indicated by the payloadSize. There are also similar methods in other video coding standards.

One piece of information may comprise one or more pieces of basic sub-information. The content of sub-information may be represented in a form of a numerical value within a certain range (generally an integer domain). For example, one piece of sub-information describes two cases, then 0 and 1 may be used to respectively represent these two cases. For another example, one piece of information describes 9 numbers which are multiples of 0.125 from 0 to 1, then integers from 0 to 8 may be used to respectively represent these 9 numbers. The sub-information is numeralized as a syntax element, and the syntax element is coded in an appropriate code according to the range and distribution of the numerical value to form a code word (formed by one or more bits), i.e. the syntax element is encoded as a string of bits. Common codes include n-bit fixed length code, an Exp-Golomb code, arithmetic coding, etc. More particularly, 1 bit of unsigned integer code comprises two code words of 0 and 1; 2 bits of unsigned integer code comprises four code words of 00, 01, 10 and 11 and code words of a 0 order of Exp-Golomb code comprise code words of 1, 010, 011, etc. A flag of binary values usually uses an unsigned integer code of 1 bit (see H.264/AVC standard document), and an index of more than two values is usually coded using an unsigned integer code using n bits (n being a positive integer) or the Exp-Golomb code, etc. The code word is recovered to a numerical value of a syntax element represented in the code word by a corresponding decoding method (e.g. a look-up table method, i.e. looking up a syntax element numerical value corresponding to the code word from a code word table). A plurality of pieces of sub-information may also be jointly numeralized as one syntax element, thereby corresponding to one code word. For example, a combination of two pieces of sub-information may be numbered, and this serial number is taken as one syntax element. The code words corresponding to a plurality of syntax elements are connected according to a specified order by certain encoding and decoding process to form a bitstream.

For example, one piece of information comprises three pieces of sub-information of A, B and C, and the information is encoded as a bitstream. The common methods comprise:

1. respectively numeralizing the three pieces of sub-information of A, B and C as three syntax elements separately, coding in three code words of MA, MB and MC, and connecting the three code words according to a certain order, e.g. MA-MB-MC (i.e. MB appears after MA and before MC in the bitstream) or MC-MA-MB, to form a bitstream; and 2. jointly numeralizing two pieces of sub-information (e.g. A and B) as one syntax element, and converting the other piece of sub-information (e.g. C) into a syntax element, and connecting the code words of the two syntax elements to form a bitstream.

It needs to be noted that some extra code words (or bits) irrelevant to the information may also be inserted between any two adjacent code words (e.g. between MA and MB, or between MB and MC) in the bitstream of the information. For example, filling bits constituted by one or continuous 0 or 1. For another example, there may be some code words corresponding to other information apart from the 3 pieces of sub-information mentioned above.

If a certain piece of sub-information A in one piece of information depends on another piece of sub-information B (i.e. when B indicates a certain special condition, the information indicated by A has not meaning), and such information is coded as a bitstream, and common methods comprise:

1. respectively writing code words corresponding to A and B in the bitstream. When B indicates the special condition, the code word corresponding to A being an appointed code word;

2. writing the code word corresponding to B in the bitstream. When B indicates the special condition, not writing the code word corresponding to A in the bitstream; otherwise, writing the code word corresponding to A after the code word corresponding to B; and 3. numeralizing all valid combinations of A and B as one syntax element, and writing a code word corresponding to the syntax element in the bitstream.

Common methods for decoding a bitstream containing a certain piece of information (constituted by a plurality of pieces of sub-information) comprise, splitting the bitstream into several code words (extra code words irrelevant to the information may be included) according to an appointed syntax element organizing order (e.g. a syntax element organizing order specified by a video coding standard), and decoding code words corresponding to the plurality of pieces of sub-information mentioned above in these code words to obtain a plurality of pieces of sub-information.

In order to improve the stereo perception of the stereo-pair, generally, a method of horizontally shifting of the stereo-pair images may be applied to adjust a parallax range presented on a display. When a left view image is shifted to right with respect to a right view image, a negative parallax increases and a positive parallax decreases; and when the left view image is shifted to left with respect to the right view image, the negative parallax decreases and the positive parallax increases.

A video sequence and depth sequence of a three-dimensional sequence may be respectively coded by multi-view video coding (MVC for short) standard (described in H.264/AVC standard Annex H). MVC specifies that video sequence of each view has its own view order index (VOIdx for short, being a non-negative integer) used for indicating the decoding order of the view video. A video sequence of the view with the minimum view order index (i.e. a video sequence of a view with VOIdx=0) is decoded firstly, and then the video sequence of the view with the secondary minimum view order index (i.e. a video sequence of a view with VOIdx=1) is decoded secondly. However, MVC does not specify a relative position among various views. Due to the lack of position information about views, a stereo display may erroneously output a right view image to the left eye for viewing, thereby leading to an erroneous three-dimensional perception. Moreover, the stereo display (or an auxiliary device such as a set-top box) may generate a sythesized view video serving as a video in a stereo-pair for displaying, thereby adjusting the parallax perception, wherein the stereo display may also need to know some important parameters related to synthesized view, e.g. a synthesized view position, synthesis precision, etc. Therefore, supplemental auxiliary information for instructing the stereo display to display the stereo-pair should also be added to the three-dimensional video sequence bitstream, comprising indication information of the left view picture, structure of the stereo-pair, synthesized view position, synthesis precision, the number of shifting samples, etc.

However, in the related art, the three-dimensional video sequence bitstream does not carry such supplemental auxiliary information required for constructing a stereo-pair. And a decoding end may outputs an arbitrarily constructed stereo-pair for displaying because of the lack of these supplemental auxiliary information, which may result in a poor perception.

Aiming at the problem mentioned above, no effective solution has been presented.

CONTENTS OF INVENTION

The present invention provides a method and device for decoding and encoding supplemental auxiliary information of a three-dimensional video sequence, so as to at least solve the technical problem in the prior art that the display effect of a constructed stereo-pair is poor because supplemental auxiliary information is not carried in a three-dimensional video sequence bitstream.

According to one aspect of the present invention, a method for decoding supplemental auxiliary information of a three-dimensional video sequence is provided, comprising: obtaining supplemental auxiliary information for constructing a stereo-pair from a three-dimensional video sequence bitstream, the supplemental auxiliary information being used for indicating the construction of the stereo-pair from a reconstructed three-dimensional video sequence, and the reconstructed three-dimensional video sequence being obtained by decoding the three-dimensional video sequence bitstream.

Preferably, the supplemental auxiliary information comprises at least one of the following: synthesized view indication, position indication information of the view with minimum view order index, a number of shifting samples, rendering precision, indication information of the selection of the view with minimum view order index and position parameters of a synthesized view, wherein the synthesized view indication is used for indicating whether the stereo-pair contains a video sequence of a synthesized view; the position indication information of the view with minimum view order index is used for indicating the relative left and/or right position of a video sequence in the video sequences of two views in the three-dimensional video sequence; the number of shifting samples is used for indicating a number of horizontal shifted samples performed for the video sequence images of two views in a stereo-pair; the rendering precision is used for indicating, when a stereo-pair contains a video sequence of a synthesized view, the rendering precision used for synthesizing the video of the synthesized view; the indication information of the selection of the view with minimum view order index is used for indicating, when the stereo-pair contains a synthesized view video sequence, which video sequence of the two video sequences with the minimum view order index and the secondary minimum view order index is used in constructing the stereo-pair with the synthesized view video; and the position parameters of a synthesized view is used for indicating, when the stereo-pair contains a synthesized view video sequence, the position of the synthesized view corresponding to the synthesized view video sequence on the straight line constituted by the two views in the three-dimensional video sequence with the minimum view order index and the secondary minimum view order index.

Preferably, obtaining supplemental auxiliary information for constructing a stereo-pair from a three-dimensional video sequence bitstream comprises: extracting a supplemental auxiliary information bitstream from the three-dimensional video sequence bitstream; and decoding the supplemental auxiliary information bitstream to obtain the supplemental auxiliary information.

Preferably, the supplemental auxiliary information is in at least one of the following information units of the three-dimensional video sequence bitstream: video usability information, supplemental enhancement information and subset sequence parameter set.

According to another aspect of the present invention, a method for encoding supplemental auxiliary information of a three-dimensional video sequence is provided, comprising: writing supplemental auxiliary information of a three-dimensional video sequence bitstream in a three-dimensional video sequence bitstream, the supplemental auxiliary information being used for indicating the construction of the stereo-pair from a reconstructed three-dimensional video sequence, and the reconstructed three-dimensional video sequence being obtained by decoding the three-dimensional video sequence bitstream.

Preferably, the supplemental auxiliary information comprises at least one of the following: synthesized view indication, position indication information of the view with minimum view order index, a number of shifting samples, rendering precision, indication information of the selection of the view with minimum view order index and position parameters of a synthesized view, wherein the synthesized view indication is used for indicating whether the stereo-pair contains a video sequence of a synthesized view; the position indication information of the view with minimum view order index is used for indicating the relative left and/or right position of a video sequence in the video sequences of two views in the three-dimensional video sequence; the number of shifting samples is used for indicating a number of horizontal shifted samples performed for the video sequence images of two views in a stereo-pair; the rendering precision is used for indicating, when a stereo-pair contains a video sequence of a synthesized view, the rendering precision used for synthesizing the video of the synthesized view; the indication information of the selection of the view with minimum view order index is used for indicating, when the stereo-pair contains a synthesized view video sequence, which video sequence of the two video sequences with the minimum view order index and the secondary minimum view order index is used in constructing the stereo-pair with the synthesized view video; and the position parameters of a synthesized view is used for indicating, when the stereo-pair contains a synthesized view video sequence, the position of the synthesized view corresponding to the synthesized view video sequence on the straight line constituted by the two views in the three-dimensional video sequence with the minimum view order index and the secondary minimum view order index.

Preferably, writing supplemental auxiliary information of a three-dimensional video sequence bitstream in a three-dimensional video sequence bitstream comprises: encoding the supplemental auxiliary information as a supplemental auxiliary information bitstream; and writing the supplemental auxiliary information bitstream in the three-dimensional video sequence bitstream.

Preferably, writing the supplemental auxiliary information in the three-dimensional video sequence bitstream comprises: writing the supplemental auxiliary information in at least one of the following information units of the three-dimensional video sequence bitstream: video usability information, supplemental enhancement information and subset sequence parameter set.

According to one aspect of the present invention, a method for decoding supplemental auxiliary information of a three-dimensional video sequence is provided, comprising: obtaining a number of shifting samples from a three-dimensional video sequence bitstream used for indicating the number of horizontal shifted samples which is used to perform horizontal shifting on the pictures of the two views of a stereo-pare constructed using the reconstructed three-dimensional video sequence, wherein the reconstructed three-dimensional video sequence is obtained by decoding the three-dimensional video sequence bitstream.

Preferably, obtaining a number of shifting samples from a three-dimensional video sequence bitstream used for indicating the number of horizontal shifted samples which is used to perform horizontal shifting on the pictures of the two views of a stereo-pare constructed using the reconstructed three-dimensional video sequence comprises: extracting a supplemental auxiliary information bitstream carrying the number of shifting samples from the three-dimensional video sequence bitstream; and decoding the supplemental auxiliary information bitstream to obtain the number of shifting samples.

Preferably, the number of shifting samples is in at least one of the following information units of the three-dimensional video sequence bitstream: video usability information, supplemental enhancement information and subset sequence parameter set.

According to one aspect of the present invention, a method for encoding supplemental auxiliary information of a three-dimensional video sequence is provided, comprising: writing a number of shifting samples in a three-dimensional video sequence bitstream, wherein the number of shifting samples is used for indicating a number of shifting samples from a three-dimensional video sequence bitstream used for indicating the number of horizontal shifted samples which is used to perform horizontal shifting on the pictures of the two views of a stereo-pare constructed using the reconstructed three-dimensional video sequence, wherein the reconstructed three-dimensional video sequence is obtained by decoding the three-dimensional video sequence bitstream.

Preferably, writing a number of shifting samples in the three-dimensional video sequence bitstream comprises: encoding the number of shifting samples as a supplemental auxiliary information bitstream; and writing the supplemental auxiliary information bitstream carrying the number of shifting samples in the three-dimensional video sequence bitstream.

Preferably, writing the number of shifting samples in the three-dimensional video sequence bitstream comprises: writing the number of shifting samples in at least one of the following information units of the three-dimensional video sequence bitstream: video usability information, supplemental enhancement information and subset sequence parameter set.

According to one aspect of the present invention, a device for decoding supplemental auxiliary information of a three-dimensional video sequence is provided, comprising: a supplemental auxiliary information obtaining unit, configured to obtain supplemental auxiliary information for constructing a stereo-pair from a three-dimensional video sequence bitstream, wherein the supplemental auxiliary information is used for indicating that the stereo-pair is constructed from a reconstructed three-dimensional video sequence, wherein the reconstructed three-dimensional video sequence is a result obtained after the three-dimensional video sequence bitstream is decoded.

Preferably, the supplemental auxiliary information obtaining unit comprises: a supplemental auxiliary information bitstream extracting module, configured to extract a supplemental auxiliary information bitstream from the three-dimensional video sequence bitstream; and a supplemental auxiliary information bitstream decoding module, configured to decode the supplemental auxiliary information bitstream to obtain the supplemental auxiliary information.

According to one aspect of the present invention, a device for encoding supplemental auxiliary information of a three-dimensional video sequence is provided, comprising: a supplemental auxiliary information writing unit, configured to write supplemental auxiliary information of a three-dimensional video sequence bitstream in a three-dimensional video sequence bitstream, wherein the supplemental auxiliary information is used for indicating the construction of a stereo-pair from a reconstructed three-dimensional video sequence, wherein the reconstructed three-dimensional video sequence is obtained by decoding the three-dimensional video sequence bitstream.

Preferably, the supplemental auxiliary information writing unit comprises: a supplemental auxiliary information bitstream generating module, configured to encode the supplemental auxiliary information as a supplemental auxiliary information bitstream; and a supplemental auxiliary information bitstream writing module, configured to write the supplemental auxiliary information bitstream in the three-dimensional video sequence bitstream.

According to one aspect of the present invention, a device for decoding supplemental auxiliary information of a three-dimensional video sequence is provided, comprising: a supplemental auxiliary information obtaining unit, configured to obtain a number of shifting samples used for indicating a number of shifting samples from a three-dimensional video sequence bitstream used for indicating the number of horizontal shifted samples which is used to perform horizontal shifting on the pictures of the two views of a stereo-pare constructed using the reconstructed three-dimensional video sequence, wherein the reconstructed three-dimensional video sequence is obtained by decoding the three-dimensional video sequence bitstream.

Preferably, the supplemental auxiliary information obtaining unit comprises: a supplemental auxiliary information bitstream extracting module, configured to extract a supplemental auxiliary information bitstream carrying the number of shifting samples from the three-dimensional video sequence bitstream; and a supplemental auxiliary information bitstream decoding module, configured to decode the supplemental auxiliary information bitstream to obtain the number of shifting samples.

According to one aspect of the present invention, a device for encoding supplemental auxiliary information of a three-dimensional video sequence is provided, comprising: a supplemental auxiliary information writing unit, configured to write a number of shifting samples in a three-dimensional video sequence bitstream, wherein the number of shifting samples is used for indicating a number of shifting samples from a three-dimensional video sequence bitstream used for indicating the number of horizontal shifted samples which is used to perform horizontal shifting on the pictures of the two views of a stereo-pare constructed using the reconstructed three-dimensional video sequence, wherein the reconstructed three-dimensional video sequence is obtained by decoding the three-dimensional video sequence bitstream.

Preferably, the supplemental auxiliary information writing unit comprises: a supplemental auxiliary information bitstream generating module, configured to encode the number of shifting samples as a supplemental auxiliary information bitstream; and a supplemental auxiliary information bitstream writing module, configured to write the supplemental auxiliary information bitstream carrying the number of shifting samples in the three-dimensional video sequence bitstream.

According to one aspect of the present invention, a method for encoding supplemental auxiliary information of a three-dimensional video sequence is provided, comprising: encoding supplemental auxiliary information of a three-dimensional video sequence corresponding to a three-dimensional video sequence bitstream as a supplemental auxiliary information bitstream, and writing the supplemental auxiliary information bitstream in the three-dimensional video sequence bitstream, wherein the supplemental auxiliary information of a three-dimensional video sequence is used for indicating processing of generating a stereo-pair from a reconstructed three-dimensional video sequence, comprising at least one of the following: the synthesized view indication, used for indicating one of the following two cases: the stereo-pair being a stereo-pair formed as two video sequences with the minimum view order index and the secondary minimum view order index in the three-dimensional video sequence; or the stereo-pair being a stereo-pair formed as one of the two video sequences with the minimum view order index and the secondary minimum view order index in the three-dimensional video sequence and a synthesized video sequence; the position indication information of the view with minimum view order index being left view, used for identifying whether the view with the minimum view order index in the three-dimensional video sequence is on the left of the view with the secondary minimum view order index in the three-dimensional video sequence, so as to indicate a left-right relationship of video sequences of the two view in the stereo-pair; the number of shifting samples, used for indicating a number of horizontal shifted samples performed for the video sequence images of two views in a stereo-pair; the rendering precision, used for indicating, when a stereo-pair contains a video sequence of a synthesized view, the rendering precision used for synthesizing the video of the synthesized view; the indication information of the selection of the view with minimum view order index, used for indicating, when the stereo-pair contains a synthesized view video sequence, which video sequence of the two video sequences with the minimum view order index and the secondary minimum view order index is used in constructing the stereo-pair with the synthesized view video; the position parameters of a synthesized view, used for indicating, when the stereo-pair contains a synthesized view video sequence, the position of the synthesized view corresponding to the synthesized view video sequence on the straight line constituted by the two views in the three-dimensional video sequence with the minimum view order index and the secondary minimum view order index.

Preferably, the supplemental auxiliary information bitstream is written in the three-dimensional video sequence bitstream using one of the following means: writing part or all information in the supplemental auxiliary information bitstream in supplemental enhancement information of the three-dimensional video sequence bitstream; writing part or all information in the supplemental auxiliary information bitstream in video usability information of the three-dimensional video sequence bitstream; or writing part or all information in the supplemental auxiliary information bitstream in subset sequence parameter set of the three-dimensional video sequence bitstream.

According to one aspect of the present invention, a method for decoding supplemental auxiliary information of a three-dimensional video sequence is provided, comprising: extracting a supplemental auxiliary information bitstream from a three-dimensional video sequence bitstream, and decoding the supplemental auxiliary information bitstream to obtain supplemental auxiliary information of a three-dimensional video sequence, wherein the supplemental auxiliary information of a three-dimensional video sequence is used for indicating processing of generating a stereo-pair from a reconstructed three-dimensional video sequence, comprising at least one of the following: the synthesized view indication, used for indicating one of the following two cases: the stereo-pair being a stereo-pair formed as two video sequences with the minimum view order index and the secondary minimum view order index in the three-dimensional video sequence; or the stereo-pair being a stereo-pair formed as one of the two video sequences with the minimum view order index and the secondary minimum view order index in the three-dimensional video sequence and a synthesized video sequence; the position indication information of the view with minimum view order index being left view, used for identifying whether the view with the minimum view order index in the three-dimensional video sequence is on the left of the view with the secondary minimum view order index in the three-dimensional video sequence, so as to indicate a left-right relationship of video sequences of the two view in the stereo-pair; the number of shifting samples, used for indicating a number of horizontal shifted samples performed for the video sequence images of two views in a stereo-pair; the rendering precision, used for indicating, when a stereo-pair contains a video sequence of a synthesized view, the rendering precision used for synthesizing the video of the synthesized view; the indication information of the selection of the view with minimum view order index, used for indicating, when the stereo-pair contains a synthesized view video sequence, which video sequence of the two video sequences with the minimum view order index and the secondary minimum view order index is used in constructing the stereo-pair with the synthesized view video; the position parameters of a synthesized view, used for indicating, when the stereo-pair contains a synthesized view video sequence, the position of the synthesized view corresponding to the synthesized view video sequence on the straight line constituted by the two views in the three-dimensional video sequence with the minimum view order index and the secondary minimum view order index.

Preferably, the supplemental auxiliary information bitstream is extracted from the three-dimensional video sequence bitstream using one of the following means: obtaining part or all information of the supplemental auxiliary information bitstream from supplemental enhancement information of the three-dimensional video sequence bitstream; obtaining part or all information of the supplemental auxiliary information bitstream from video usability information of the three-dimensional video sequence bitstream; or obtaining part or all information of the supplemental auxiliary information bitstream from subset sequence parameter set of the three-dimensional video sequence bitstream.

According to one aspect of the present invention, a device for encoding supplemental auxiliary information of a three-dimensional video sequence is provided, comprising: a supplemental auxiliary information bitstream generating module, configured to encode supplemental auxiliary information of a three-dimensional video sequence corresponding to a three-dimensional video sequence bitstream as a supplemental auxiliary information bitstream, wherein an input of the supplemental auxiliary information bitstream generating module is supplemental auxiliary information of a three-dimensional video sequence, and an output is a supplemental auxiliary information bitstream; and a supplemental auxiliary information bitstream writing module, configured to write the supplemental auxiliary information bitstream in a three-dimensional video sequence bitstream, wherein an input of the supplemental auxiliary information bitstream writing module is the supplemental auxiliary information bitstream and the three-dimensional video sequence bitstream, and an output is a three-dimensional video sequence bitstream containing the supplemental auxiliary information bitstream, wherein the supplemental auxiliary information of a three-dimensional video sequence is used for indicating processing of generating a stereo-pair from a reconstructed three-dimensional video sequence, wherein the supplemental auxiliary information of a three-dimensional video sequence comprises at least one of the following: the synthesized view indication, used for indicating one of the following two cases: the stereo-pair being a stereo-pair formed as two video sequences with the minimum view order index and the secondary minimum view order index in the three-dimensional video sequence; or the stereo-pair being a stereo-pair formed as one of the two video sequences with the minimum view order index and the secondary minimum view order index in the three-dimensional video sequence and a synthesized video sequence; the position indication information of the view with minimum view order index being left view, used for identifying whether the view with the minimum view order index in the three-dimensional video sequence is on the left of the view with the secondary minimum view order index in the three-dimensional video sequence, so as to indicate a left-right relationship of video sequences of the two view in the stereo-pair; the number of shifting samples, used for indicating a number of horizontal shifted samples performed for the video sequence images of two views in a stereo-pair; the rendering precision, used for indicating, when a stereo-pair contains a video sequence of a synthesized view, the rendering precision used for synthesizing the video of the synthesized view; the indication information of the selection of the view with minimum view order index, used for indicating, when the stereo-pair contains a synthesized view video sequence, which video sequence of the two video sequences with the minimum view order index and the secondary minimum view order index is used in constructing the stereo-pair with the synthesized view video; the position parameters of a synthesized view, used for indicating, when the stereo-pair contains a synthesized view video sequence, the position of the synthesized view corresponding to the synthesized view video sequence on the straight line constituted by the two views in the three-dimensional video sequence with the minimum view order index and the secondary minimum view order index.

Preferably, the supplemental auxiliary information bitstream writing module is further configured to write the supplemental auxiliary information bitstream in a three-dimensional video sequence bitstream using to at least one of the following means: writing part or all information in the supplemental auxiliary information bitstream in supplemental enhancement information of the three-dimensional video sequence bitstream; writing part or all information in the supplemental auxiliary information bitstream in video usability information of the three-dimensional video sequence bitstream; or writing part or all information in the supplemental auxiliary information bitstream in subset sequence parameter set of the three-dimensional video sequence bitstream.

According to one aspect of the present invention, a device for decoding supplemental auxiliary information of a three-dimensional video sequence is provided, comprising: a supplemental auxiliary information bitstream extracting module, configured to extract a supplemental auxiliary information bitstream from a three-dimensional video sequence bitstream, wherein an input of the supplemental auxiliary information bitstream extracting module is a three-dimensional video sequence bitstream, and an output is the supplemental auxiliary information bitstream; and a supplemental auxiliary information bitstream decoding module, configured to decode the supplemental auxiliary information bitstream to obtain supplemental auxiliary information of a three-dimensional video sequence, wherein an input of the supplemental auxiliary information bitstream decoding module is the supplemental auxiliary information bitstream, and an output is the supplemental auxiliary information of a three-dimensional video sequence, wherein the supplemental auxiliary information of a three-dimensional video sequence is used for indicating processing of generating a stereo-pair from a reconstructed three-dimensional video sequence, comprising at least one of the following: the synthesized view indication, used for indicating one of the following two cases: the stereo-pair being a stereo-pair formed as two video sequences with the minimum view order index and the secondary minimum view order index in the three-dimensional video sequence; or the stereo-pair being a stereo-pair formed as one of the two video sequences with the minimum view order index and the secondary minimum view order index in the three-dimensional video sequence and a synthesized video sequence; the position indication information of the view with minimum view order index being left view, used for identifying whether the view with the minimum view order index in the three-dimensional video sequence is on the left of the view with the secondary minimum view order index in the three-dimensional video sequence, so as to indicate a left-right relationship of video sequences of the two view in the stereo-pair; the number of shifting samples, used for indicating a number of horizontal shifted samples performed for the video sequence images of two views in a stereo-pair; the rendering precision, used for indicating, when a stereo-pair contains a video sequence of a synthesized view, the rendering precision used for synthesizing the video of the synthesized view; the indication information of the selection of the view with minimum view order index, used for indicating, when the stereo-pair contains a synthesized view video sequence, which video sequence of the two video sequences with the minimum view order index and the secondary minimum view order index is used in constructing the stereo-pair with the synthesized view video; the position parameters of a synthesized view, used for indicating, when the stereo-pair contains a synthesized view video sequence, the position of the synthesized view corresponding to the synthesized view video sequence on the straight line constituted by the two views in the three-dimensional video sequence with the minimum view order index and the secondary minimum view order index.

Preferably, the supplemental auxiliary information bitstream extracting module is further configured to extract a supplemental auxiliary information bitstream from a three-dimensional video sequence bitstream using at least one of the following means: obtaining part or all information of the supplemental auxiliary information bitstream from supplemental enhancement information of the three-dimensional video sequence bitstream; obtaining part or all information of the supplemental auxiliary information bitstream from video usability information of the three-dimensional video sequence bitstream; or obtaining part or all information of the supplemental auxiliary information bitstream from subset sequence parameter set of the three-dimensional video sequence bitstream.

According to one aspect of the present invention, a supplemental auxiliary information bitstream of a three-dimensional video sequence is provided, the supplemental auxiliary information bitstream of a three-dimensional video sequence carrying supplemental auxiliary information of a three-dimensional video sequence used for indicating generating a stereo-pair from a reconstructed three-dimensional video sequence, the supplemental auxiliary information of a three-dimensional video sequence comprising at least one of the following: the synthesized view indication, used for indicating one of the following two cases: the stereo-pair being a stereo-pair formed as two video sequences with the minimum view order index and the secondary minimum view order index in the three-dimensional video sequence; or the stereo-pair being a stereo-pair formed as one of the two video sequences with the minimum view order index and the secondary minimum view order index in the three-dimensional video sequence and a synthesized video sequence; the position indication information of the view with minimum view order index being left view, used for identifying whether the view with the minimum view order index in the three-dimensional video sequence is on the left of the view with the secondary minimum view order index in the three-dimensional video sequence, so as to indicate a left-right relationship of video sequences of the two view in the stereo-pair; the number of shifting samples, used for indicating a number of horizontal shifted samples performed for the video sequence images of two views in a stereo-pair; the rendering precision, used for indicating, when a stereo-pair contains a video sequence of a synthesized view, the rendering precision used for synthesizing the video of the synthesized view; the indication information of the selection of the view with minimum view order index, used for indicating, when the stereo-pair contains a synthesized view video sequence, which video sequence of the two video sequences with the minimum view order index and the secondary minimum view order index is used in constructing the stereo-pair with the synthesized view video; the position parameters of a synthesized view, used for indicating, when the stereo-pair contains a synthesized view video sequence, the position of the synthesized view corresponding to the synthesized view video sequence on the straight line constituted by the two views in the three-dimensional video sequence with the minimum view order index and the secondary minimum view order index.

Preferably, the supplemental auxiliary information bitstream exists in a three-dimensional video sequence bitstream according to one of the following means: part or all information in the supplemental auxiliary information bitstream exists in supplemental enhancement information of the three-dimensional video sequence bitstream; part or all information in the supplemental auxiliary information bitstream exists in video usability information of the three-dimensional video sequence bitstream; and part or all information in the supplemental auxiliary information bitstream exists in subset sequence parameter set of the three-dimensional video sequence bitstream, wherein the composition of the supplemental auxiliary information bitstream comprises: when the synthesized view indication indicates that the stereo-pair is formed as the two video sequences of the views with the minimum view order index and the secondary minimum view order index in the three-dimensional video sequence, the supplemental auxiliary information bitstream not containing bits corresponding to the rendering precision, the indication information of the selection of the view with minimum view order index, and the position parameters of a synthesized view; and when the virtual view synthesis identification indicates that the stereo-pair is formed as a synthesized video sequence and one of the two video sequences of the views with the minimum view order index and the secondary minimum view order index in the three-dimensional video sequence, the supplemental auxiliary information bitstream containing bits corresponding to at least one of the rendering precision, the indication information of the selection of the view with minimum view order index, and the position parameters of a synthesized view.

In the present invention, supplemental auxiliary information is carried in the three-dimensional video sequence bitstream, thereby enabling that these supplemental auxiliary information may be referred to when a stereo-pair is constructed from a reconstructed three-dimensional video sequence, enabling the displaying quality of the constructed stereo-pair to be better, thereby solving the technical problem in the prior art that degraded displaying quality of a constructed stereo-pair appears because of the lack of supplemental auxiliary information in a three-dimensional video sequence bitstream, and achieving the technical effect of improving the display quality of a constructed stereoscopic video.

DESCRIPTION OF THE ACCOMPANYING DRAWINGS

Drawings, provided for further understanding of the disclosure and forming a part of the specification, are used to explain the disclosure together with embodiments of the disclosure rather than to limit the disclosure. In the accompanying drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
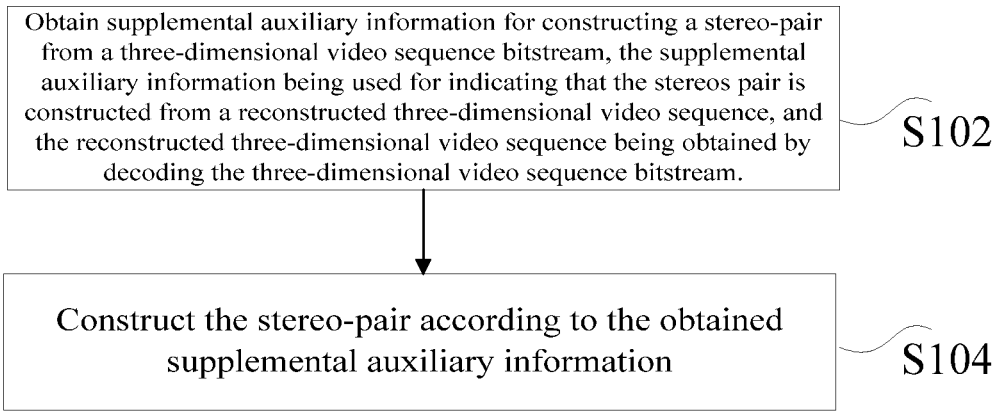
FIG. 1 is a preferred flowchart of a method for decoding supplemental auxiliary information of a three-dimensional video sequence according to the embodiments of the present invention.

The embodiments or the present invention provide a preferred method for decoding supplemental auxiliary information of a three-dimensional video sequence. As shown in FIG. 1, the method comprises the following steps:

step S102: supplemental auxiliary information for constructing a stereo-pair is obtained from a three-dimensional video sequence bitstream, wherein the supplemental auxiliary information is used for indicating that the stereo-pair is constructed from a reconstructed three-dimensional video sequence, wherein the reconstructed three-dimensional video sequence is obtained by decoding the three-dimensional video sequence bitstream.

Step S104, the stereo-pair is constructed according to the obtained supplemental auxiliary information.

In the preferred embodiment mentioned above, supplemental auxiliary information is carried in the three-dimensional video sequence bitstream, thereby enabling that these supplemental auxiliary information may be referred to when a stereo-pair is constructed from a reconstructed three-dimensional video sequence, enabling the display quality of the constructed stereo-pair to be better, thereby solving the technical problem in the prior art that degraded displaying quality of a constructed stereo-pair appears because of the lack of supplemental auxiliary information in a three-dimensional video sequence bitstream, and achieving the technical effect of improving the display quality of a constructed stereoscopic video.

Figure 2:
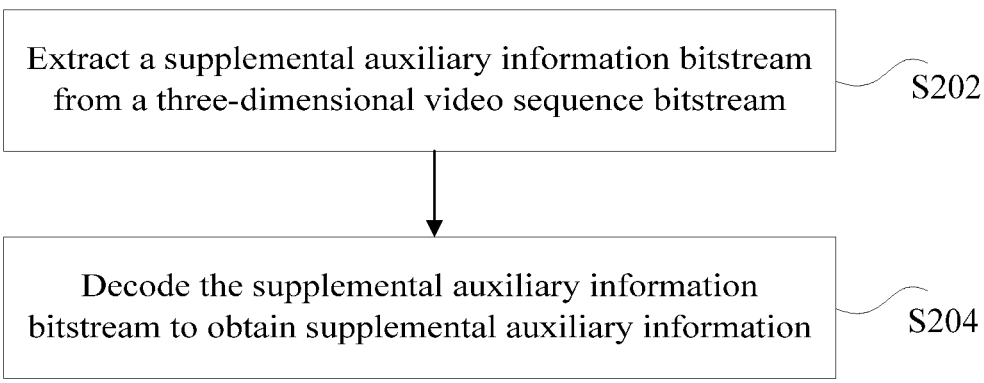
FIG. 2 is a preferred flowchart of obtaining supplemental auxiliary information according to the embodiments of the present invention.

As regards the supplemental auxiliary information mentioned above, a supplemental auxiliary information bitstream may be generated firstly, and then this supplemental auxiliary information bitstream is recorded in a three-dimensional video bitstream, and accordingly, when the supplemental auxiliary information is recovered, the supplemental auxiliary information bitstream may also be extracted firstly. In a preferred embodiment, as shown in FIG. 2, the following steps are comprised: obtaining supplemental auxiliary information for constructing a stereo-pair from a three-dimensional video sequence bitstream comprises:

step S202: extracting a supplemental auxiliary information bitstream from a three-dimensional video sequence bitstream; and step S204: decoding the supplemental auxiliary information bitstream to obtain supplemental auxiliary information.

Preferably, when the stereo-pair is constructed after the reconstructed three-dimensional video sequence from the three-dimensional video sequence bitstream, video sequences of two views in the reconstructed three-dimensional video sequence are recorded as A and B, and a stereo-pair may be constructed directly by A and B, and a virtual synthesized view video sequence C may be generated firstly by using at least one of A and B, and then a stereo-pair is constructed as A and C or a stereo-pair is constructed as B and C. When the supplemental auxiliary information does not contain virtual view synthesis identification, in addition to the method mentioned above, two synthesized view video sequences D and E may also be generated by using several views in the three-dimensional video sequence, and then a stereo-pair is constructed by D and E.

Since there is a method for decoding supplemental auxiliary information of a three-dimensional video sequence mentioned above, there is also a method for encoding supplemental auxiliary information of a three-dimensional video sequence. In a preferred embodiment, a method for encoding supplemental auxiliary information of a three-dimensional video sequence is provided, comprising: writing supplemental auxiliary information of a three-dimensional video sequence bitstream in a three-dimensional video sequence bitstream, the supplemental auxiliary information being used for indicating that the stereo-pair is constructed from a reconstructed three-dimensional video sequence, and the reconstructed three-dimensional video sequence being obtained by decoding the three-dimensional video sequence bitstream.

Figure 3:
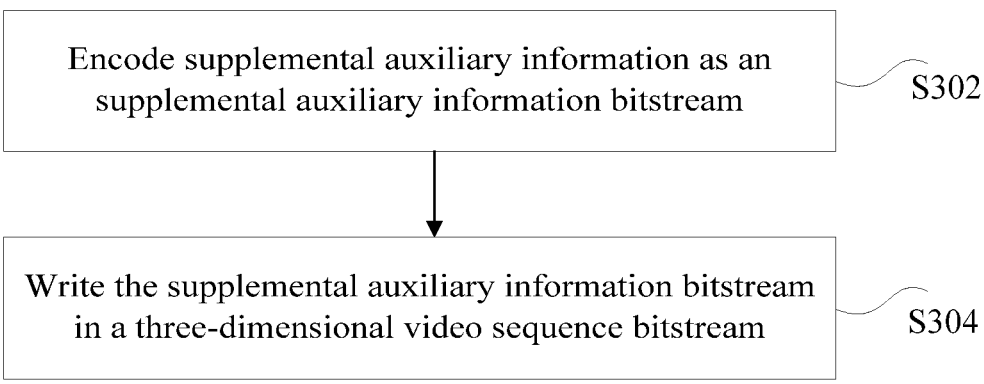
FIG. 3 is a preferred flowchart of writing supplemental auxiliary information in a three-dimensional video sequence bitstream according to the embodiments of the present invention.

As shown in FIG. 3, writing supplemental auxiliary information of a three-dimensional video sequence bitstream in a three-dimensional video sequence bitstream may comprise the following steps:

step S302: encoding supplemental auxiliary information as a supplemental auxiliary information bitstream; and step S304: writing the supplemental auxiliary information bitstream in a three-dimensional video sequence bitstream.

The supplemental auxiliary information or supplemental auxiliary information bitstream may be carried in some information used for encoding or decoding of the three-dimensional video sequence bitstream, for example, may but not limited to carrying the supplemental auxiliary information in at least one of the following information units of the three-dimensional video sequence bitstream: video usability information, supplemental enhancement information and subset sequence parameter set.

In various preferred embodiments mentioned above, the supplemental auxiliary information comprises but not limited to at least one of the following: synthesized view indication, position indication information of the view with minimum view order index, a number of shifting samples, rendering precision, indication information of the selection of the view with minimum view order index and position parameters of a synthesized view, wherein the specific functions and meanings of these several parameters are described below.

1) synthesized view indication is used for indicating whether the stereo-pair contains a synthesized view video sequence; preferably, a stereo-pair may be only composed of a video sequence of the view with the minimum view order index and a video sequence of the view with the secondary minimum view order index, and may also be composed of a synthesized view and a view of the two views mentioned above, and preferably, may also be composed of two synthesized views. The synthesized view mentioned above is synthesized by using the two sequences of the views with the minimum view order index and the secondary minimum view order index;

2) position indication information of the view with minimum view order index is used for indicating a left-right relationship of video sequences of two views in the three-dimensional video sequence, i.e. indicating the view with the minimum view order index being left view by the position indication for the view with the minimum view order index, and accordingly, the other view is a right view, or vice versa, i.e. the view with the minimum view order index is indicated as the right view;

3) a number of shifting samples is used for indicating a number of horizontal shifted samples performed for the video sequence images of two views in a stereo-pair;

4) rendering precision is used for indicating, when a stereo-pair contains a video sequence of a synthesized view, the rendering precision used for synthesizing the video of the synthesized view;

5) indication information of the selection of the view with minimum view order index is used for identifying, when the stereo-pair contains a synthesized view video sequence, which video sequence of the two video sequences with the minimum view order index and the secondary minimum view order index is used in constructing the stereo-pair with the synthesized view video; that is, by indication information of the selection of the view with minimum view order index, it can be known which one of the two video sequences of the views with the minimum view order index and the secondary minimum view order index is used in the construction of the stereo-pair with the synthesized view.

6) position parameters of a synthesized view is used for indicating, when the stereo-pair contains a synthesized view video sequence, the position of the synthesized view corresponding to the synthesized view video sequence on the straight line constituted by the two views in the three-dimensional video sequence with the minimum view order index and the secondary minimum view order index.

Preferably, if the supplemental auxiliary information does not completely carry the several kinds of supplemental auxiliary information mentioned above, then when a decoding end constructs the stereo-pair, as regards parameter information not carried, a pre-determined parameter numerical value may be applied or a finally applied parameter numerical value may be determined according to other information.

The embodiments of the present invention also provide a preferred embodiment to illustrate carrying the supplemental auxiliary information, namely, a number of shifting samples, in the three-dimensional video sequence bitstream. Particularly, a method for decoding supplemental auxiliary information of a three-dimensional video sequence corresponding to a number of shifting samples may comprise: obtaining a number of shifting samples used for indicating the number of horizontal shifted samples which is used to perform horizontal shifting on the pictures of the two views of a stereo-pare constructed using the reconstructed three-dimensional video sequence, wherein the reconstructed three-dimensional video sequence is obtained by decoding the three-dimensional video sequence bitstream.

Accordingly, obtaining a number of shifting samples used for indicating the number of horizontal shifted samples which is used to perform horizontal shifting on the pictures of the two views of a stereo-pare constructed using the reconstructed three-dimensional video sequence may comprise the following steps:

step S1: extracting a supplemental auxiliary information bitstream carrying the number of shifting samples from the three-dimensional video sequence bitstream; and step S2: decoding the supplemental auxiliary information bitstream to obtain the number of shifting samples.

A method for decoding supplemental auxiliary information of a three-dimensional video sequence regarding the number of shifting samples may comprise: writing a number of shifting samples in a three-dimensional video sequence bitstream, wherein the number of shifting samples is used for indicating the number of horizontal shifted samples which is used to perform horizontal shifting on the pictures of the two views of a stereo-pare constructed using the reconstructed three-dimensional video sequence, wherein the reconstructed three-dimensional video sequence is obtained by decoding the three-dimensional video sequence bitstream.

In a preferred embodiment, writing a number of shifting samples in the three-dimensional video sequence bitstream may comprise the following steps:

step S1: encoding the number of shifting samples as a supplemental auxiliary information bitstream; and step S2: writing the supplemental auxiliary information bitstream carrying the number of shifting samples in the three-dimensional video sequence bitstream.

Preferably, the number of shifting samples may be but not limited to being carried in at least one of the following information units of the three-dimensional video sequence bitstream: video usability information, supplemental enhancement information and subset sequence parameter set.

Figure 4:
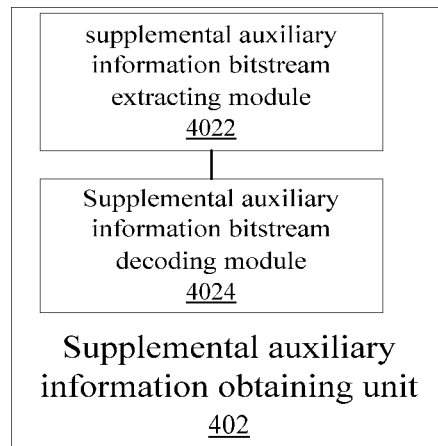
FIG. 4 is a preferred structural block diagram of a device for decoding supplemental auxiliary information of a three-dimensional video sequence according to the embodiments of the present invention.

In the present embodiment, a device for decoding supplemental auxiliary information of a three-dimensional video sequence is also provided. The device is used for implementing the embodiments and preferred embodiments mentioned above, and what has been illustrated will not be described redundantly. As will be used below, the terms "unit" or "module" is a combination of software and/or hardware which may implement a pre-determined function. Although the device described in the embodiments below is preferably implemented by software, the embodiment of hardware, or a combination of software and hardware may also be conceivable. FIG. 4 is a preferred structural block diagram of a device for decoding supplemental auxiliary information of a three-dimensional video sequence according to the embodiments of the present invention. As shown in FIG. 4, it comprises: a supplemental auxiliary information obtaining unit 402. The structure is illustrated below.

The supplemental auxiliary information obtaining unit 402 is configured to obtain supplemental auxiliary information for constructing a stereo-pair from a three-dimensional video sequence bitstream, wherein the supplemental auxiliary information is used for indicating that the stereo-pair is constructed from a reconstructed three-dimensional video sequence, wherein the reconstructed three-dimensional video sequence is obtained by decoding the three-dimensional video sequence bitstream.

In a preferred embodiment, as shown in FIG. 4, the supplemental auxiliary information obtaining unit comprises:

a supplemental auxiliary information bitstream extracting module 4022, configured to extract a supplemental auxiliary information bitstream from the three-dimensional video sequence bitstream; and a supplemental auxiliary information bitstream decoding module 4024, coupled with the supplemental auxiliary information bitstream extracting module 4022 and is configured to decode the supplemental auxiliary information bitstream to obtain the supplemental auxiliary information.

Figure 5:
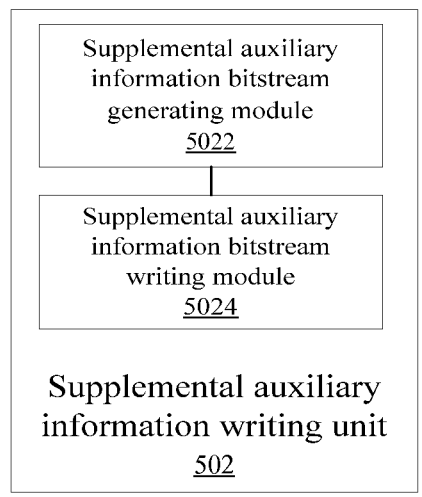
FIG. 5 is a preferred structural block diagram of a device for encoding supplemental auxiliary information of a three-dimensional video sequence according to the embodiments of the present invention.

A device for encoding supplemental auxiliary information of a three-dimensional video sequence is also provided in the present embodiment. As shown in FIG. 5, it comprises:

a supplemental auxiliary information writing unit 502, configured to write supplemental auxiliary information of a three-dimensional video sequence bitstream in a three-dimensional video sequence bitstream, wherein the supplemental auxiliary information is used for indicating that a stereo-pair is constructed from a reconstructed three-dimensional video sequence, wherein the reconstructed three-dimensional video sequence is obtained by decoding the three-dimensional video sequence bitstream. The supplemental auxiliary information writing unit comprises: a supplemental auxiliary information bitstream generating module 5022, configured to encode the supplemental auxiliary information as a supplemental auxiliary information bitstream; and a supplemental auxiliary information bitstream writing module 5024, coupled with the supplemental auxiliary information bitstream generating module 5022 and is configured to write the supplemental auxiliary information bitstream in the three-dimensional video sequence bitstream.

The embodiments of the present invention will be described in further detail in conjunction with several preferred embodiments:

The supplemental auxiliary information of a three-dimensional video sequence is used for indicating generating a stereo-pair suitable for binocular stereoscopic viewing from a reconstructed three-dimensional video sequence, preferably, at least comprising one of the following 6 pieces of supplemental auxiliary information sub-information: synthesized view indication A, the position indication information of the view with minimum view order index being left view B, a number of shifting samples C, rendering precision D, indication information of the selection of the view with minimum view order index E, and position parameters of a synthesized view F.

The synthesized view indication A is used for identifying at least one of the following cases:

(a1) forming a stereo-pair suitable for binocular stereoscopic viewing by a minimum view order index (e.g. a view order index in MVC, VOIdx for short) video sequence (e.g. a video sequence of a view of VOIdx=0) and a secondary minimum view order index video sequence (e.g. a video sequence of a view of VOIdx=1) in the three-dimensional video sequence; and (a2) forming a stereo-pair by one of the two video sequences of the views with the minimum view order index and the secondary minimum view order index in the three-dimensional video sequence and a synthesized virtual view video sequence. The synthesized view video sequence is synthesized by at least one of the minimum view order index video sequence and a depth sequence thereof and a secondary minimum view order index video sequence and a depth sequence thereof via DIBR-based view synthesis technology. The virtual view synthesis identification A may be numeralized as a syntax element comprising two values of 0 and 1, where 0 and 1 respectively represent cases (a1) and (a2), or respectively represent cases (a2) and (a1).

Preferably, if the supplemental auxiliary information does not carry the virtual view synthesis identification A, it may also indicate that the stereo-pair is formed by two virtual views synthesized by a plurality of video sequences.

The position indication information of the view with minimum view order index being left view B is used for indicating one of the following two cases:

(b1) a minimum view order index view in the three-dimensional video sequence is on the left of a secondary minimum view order index view; and (b2) the minimum view order index view in the three-dimensional video sequence is on the right of the secondary minimum view order index view.

The position indication information of the view with minimum view order index being left view B is used for indicating a left-right relationship of video sequences of two views in the stereo-pair. For example, when the stereo-pair is composed of the minimum view order index video sequence and the secondary minimum view order index video sequence (the composition information may be indicated by the virtual view synthesis identification A, and may also be pre-appointed by an encoding end and a decoding end), if B indicates the case (b1), a left view video sequence of the stereo-pair is the minimum view order index video sequence, and a right view video sequence is the secondary minimum view order index video sequence; and if B indicates the case (b2), the left view video sequence of the stereo-pair is the secondary minimum view order index video sequence, and the right view video sequence is the minimum view order index video sequence. For another example, when the stereo-pair is composed of the minimum view order index video sequence and a synthesized virtual view video sequence, if B indicates the case (b1), a left view video sequence of the stereo-pair is the minimum view order index video sequence, and a right view video sequence is the virtual view video sequence; and if B indicates the case (b2), the left view video sequence of the stereo-pair is the virtual view video sequence, and the right view video sequence is the minimum view order index video sequence. For yet another example, when the stereo-pair is composed of the secondary minimum view order index video sequence and a synthesized virtual view video sequence, if B indicates the case (b1), a left view video sequence of the stereo-pair is the virtual view video sequence, and a right view video sequence is the secondary minimum view order index video sequence; and if B indicates the case (b2), the left view video sequence of the stereo-pair is the secondary minimum view order index video sequence, and the right view video sequence is the virtual view video sequence. The minimum view order index view being left-view identification B may be numeralized as a syntax element comprising two values of 0 and 1, where 0 and 1 respectively represent cases (b2) and (b1), or respectively represent cases (b1) and (b2).

The number of shifting samples C is used for indicating a number of samples of video sequence images (called as a left view image and a right view image for short) of two views, namely, left and right, in the stereo-pair on which horizontal shifting is performed. Preferably, the number of shifting samples C may be numeralized as a syntax element comprising several integers between $-2^n$ to $2^n-1$ (including $-2^n$ and $2^n-1$), the numerical value thereof being recorded as C*, where n is a positive integer. For example, n=5 or n=6 or n=7 or n=10. However, it should be noted that the values of n listed above merely aim to better illustrate the present invention. The present invention is not limited to this and may also apply other values of n, e.g. n=13. C* being a positive number represents that the left view image shifts C* samples to left (or to right) with respect to the right view image, and C* being a negative number represents that the left view image shifts $-C^*$ samples to right (or to left) with respect to the right view image. The number of shifting samples C may also be numeralized as a syntax element comprising several integers between 0 to $2^n-1$ (including 0 and $2^n-1$), the numerical value thereof being recorded as C', where C' being greater than or equal to K ($0 \leq K \leq 2^n-1$, K being an integer) represents that the left view image shifts C'−K samples to left (or to right) with respect to the right view image, and C' being smaller than K represents that the left view image shifts K−C' samples to right (or to left) with respect to the right view image.

The rendering precision D is used for indicating, when the stereo-pair contains a synthesized virtual view video sequence, projection precision used for synthesizing the virtual view video sequence. Preferably, the rendering precision D may be numeralized as a syntax element comprising two values of 0 and 1, wherein 0 and 1 respectively represent full-pixel projection precision and ½-pixel projection precision. The rendering precision D may also be numeralized as a syntax element comprising three values of 0, 1 and 2, wherein 0, 1 and 2 respectively represent full-pixel projection precision, ½-pixel projection precision and ¼-pixel projection precision.

The indication information of the selection of the view with minimum view order index E is used for indicating one of the following two cases:

(e1) when the stereo-pair contains a synthesized virtual view video sequence, a minimum view order index video sequence in the three-dimensional video sequence serving as another video sequence in the stereo-pair, and a view corresponding to the minimum view order index video sequence being referred to as a recommended camera view; and (e2) when the stereo-pair contains a synthesized virtual view video sequence, a secondary minimum view order index video sequence in the three-dimensional video sequence serving as another video sequence in the stereo-pair, and a view corresponding to the secondary minimum view order index video sequence being referred to as the recommended camera view.

Preferably, the indication information of the selection of the view with minimum view order index E may be numeralized as a syntax element comprising two values of 0 and 1, where 0 and 1 respectively represent cases (e2) and (e1), or respectively represent cases (e1) and (e2).

The position parameters of a synthesized view F is used for indicating, when the stereo-pair contains a synthesized view video sequence, the position of the synthesized view corresponding to the synthesized view video sequence on the straight line constituted by the two views in the three-dimensional video sequence with the minimum view order index and the secondary minimum view order index. Preferably, the virtual view location parameter F may be numeralized as a syntax element comprising W ($W \leq q-p+1$, W being an integer) integers between p and q (including p and q), the numerical value thereof being recorded as F', where p and q are non-negative integers and $p < q$. For example, p=0, q=7 or p=1, q=8 or p=9, q=12 or p=0, q=31; the virtual view is on a straight line constituted by a minimum view order index view and a secondary minimum view order index view and at a location of two locations with the distance from a recommended camera view (or the minimum view order index view) being (F'+k)×L/G, where L represents a length (i.e. a distance between the two views) of a line segment constituted by the minimum view order index view and the secondary minimum view order index view, and k is an integer, e.g. k=0 or k=−1 or k=1 or k=−4 or k=4, and G is a positive integer, e.g. G=4 or G=8 or G=16 or G=15 or G=27. It may be appointed that the virtual view is always at a certain location of the two locations mentioned above, e.g. that location with a smaller sum of distances with the minimum view order index view and the secondary minimum view order index view; and a syntax element for identifying which location of the two locations mentioned above may be obtained from the three-dimensional video sequence bitstream, thereby determining the location of the virtual view.

The particular embodiments of the method for encoding and decoding supplemental auxiliary information of a three-dimensional video sequence, a corresponding device and bitstream of the present invention will be explained in detail in conjunction with particular preferred embodiments below.

Preferred Embodiment 1

In this preferred embodiment, a method for encoding supplemental auxiliary information of a three-dimensional video sequence is involved. In this embodiment, supplemental auxiliary information of a three-dimensional video sequence corresponding to a three-dimensional video sequence bitstream (obtained by encoding a three-dimensional video sequence) comprises P ($1 \leq P \leq 6$, P being an integer) pieces of supplemental auxiliary information sub-information of 6 pieces of supplemental auxiliary information sub-information of synthesized view indication A, the position indication information of the view with minimum view order index being left view B, a number of shifting samples C, rendering precision D, indication information of the selection of the view with minimum view order index E, and position parameters of a synthesized view F, etc. The P pieces of supplemental auxiliary information sub-information are respectively numeralized as P syntax elements, and are encoded as supplemental auxiliary information bitstreams. The constitution of the supplemental auxiliary information of a three-dimensional video sequence may have various combinations, and may be one of any combination of the 6 pieces of supplemental auxiliary information sub-information, for example:

Combination 1: A;
Combination 2: B;
Combination 3: C;
Combination 4: D;
Combination 5: E;
Combination 6: F;
Combination 7: B, C;
Combination 8: A, F;
Combination 9: A, B, F;
Combination 10: A, C, F;
Combination 11: A, B, E, F;
Combination 12: A, B, C, F;
Combination 13: A, B, C, E, F;
Combination 14: A, B, C, D, E, F;

The supplemental auxiliary information bitstream is written in the three-dimensional video sequence bitstream, thereby generating a three-dimensional video sequence bitstream containing the supplemental auxiliary information bitstream.

Preferred Embodiment 2

In this preferred embodiment, a method for encoding supplemental auxiliary information of a three-dimensional video sequence is involved. In this embodiment, supplemental auxiliary information of a three-dimensional video sequence corresponding to a three-dimensional video sequence bitstream comprises P ($2 \leq P \leq 6$, P being an integer) pieces of supplemental auxiliary information sub-information of 6 pieces of supplemental auxiliary information sub-information of synthesized view indication A, the position indication information of the view with minimum view order index being left view B, a number of shifting samples C, rendering precision D, indication information of the selection of the view with minimum view order index E, and position parameters of a synthesized view F, etc. The P pieces of supplemental auxiliary information sub-information are divided into Q ($1 \leq Q < P$, Q being an integer) groups, recoded as Qm ($1 \leq m \leq Q$, m being an integer). The Q groups of sub-information have various composition forms, for example, one of the following combinations:

Combination 1: {A, D}, {B}, {C} (i.e. P=4, Q=3, where A and D are one group, B is one group and C is one group, hereinafter inclusive);
Combination 2: {A, D}, {B, C, E, F};
Combination 3: {A, D}, {B}, {C}, {E}, {F};
Combination 4: {A, B}, C, {D, F, E};
Combination 5: {B, C};
Combination 6: {A, B, F}, {C}, {D}, {E}.

All the supplemental auxiliary information sub-information in each group is jointly numeralized as one syntax element (if one group only has one piece of supplemental auxiliary information sub-information, then numeralizing same alone as one syntax element), thereby obtaining Q syntax elements Taking Combination 3 ({A, D}, {B}, {C}, {E}, {F}) mentioned above as an example, the synthesized view indication A and the rendering precision D are in one group, and are jointly numeralized as a syntax element including four values of 0, 1, 2 and 3, wherein 0 represents that the synthesized view indication A indicates the case (a1), 1 represents that the synthesized view indication A indicates the case (a2) and the rendering precision D indicates the full-pixel projection precision, 2 represents that the synthesized view indication A indicates the case (a2) and the rendering precision D indicates the ½-pixel projection precision, 3 represents that the synthesized view indication A indicates the case (a2) and the rendering precision D indicates the ¼-pixel projection precision. B, C, E and F are respectively numeralized as one syntax element alone. Then, the Q syntax elements are encoded as a supplemental auxiliary information bitstream.

Then, the supplemental auxiliary information bitstream is written in the three-dimensional video sequence bitstream, thereby generating a three-dimensional video sequence bitstream containing the supplemental auxiliary information bitstream. The processing means are various, and at least comprise one of the following processing means:

means 1: this segment of supplemental auxiliary information bitstream is wholly written into one supplemental enhance information (SEI for short) message (such as a sei_message( ) syntax unit in H.264/AVC standard) in SEI, the payloadType of the SEI message being a certain integer greater than 46 (e.g. 51 or 52), and the payloadSize being N bytes (e.g. 0<N<5, N being an integer). When the length of the supplemental auxiliary information bitstream is not an integer number of bytes, a bit is filled at the end of the supplemental auxiliary information bitstream, such that the length of this SEI message is an integer number of bytes.

Means 2: the supplemental auxiliary information bitstream is wholly written in video usability information (VUI for short, such as a vui_parameter( ) syntax unit in H.264/AVC standard).

Means 3: the supplemental auxiliary information bitstream is wholly written in subset sequence parameter set (subset SPS for short, such as subset_seq_parameter_set_rbsp( ) syntax unit in H.264/AVC standard).

Means 4: when Q is greater than 1, the supplemental auxiliary information bitstream is divided into two parts, i.e. a bitstream 1 containing K (0<K<Q, K being an integer) syntax elements and a bitstream 2 containing the remaining Q-K syntax elements; and the bitstream 1 is written in one of VUI, SEI and subset SPS (e.g. subset SPS), and the bitstream 2 is written in one of the remaining two of VUI, SEI and subset SPS (e.g. SEI).

Preferred Embodiment 3

In this preferred embodiment, a method for encoding supplemental auxiliary information of a three-dimensional video sequence is involved. In this embodiment, supplemental auxiliary information of a three-dimensional video sequence corresponding to a three-dimensional video sequence bitstream at least comprises synthesized view indication A. When the synthesized view indication A indicates the case (a1) mentioned above, the supplemental auxiliary information of the three-dimensional video sequence also contains U-1 (1≤U≤3, U being an integer) pieces of supplemental auxiliary information sub-information in two pieces of supplemental auxiliary information sub-information of position indication information of the view with minimum view order index being left view B and a number of shifting samples C, etc., i.e. at this moment, the supplemental auxiliary information of the three-dimensional video sequence includes U pieces of supplemental auxiliary information sub-information in all. When the synthesized view indication A indicates the case (a2) mentioned above, the supplemental auxiliary information of the three-dimensional video sequence also contains V-1 (1≤V≤6, V being an integer) pieces of supplemental auxiliary information sub-information in five pieces of supplemental auxiliary information sub-information of position indication information of the view with minimum view order index being left view B, a number of shifting samples C, rendering precision D, indication information of the selection of the view with minimum view order index E, and position parameters of a synthesized view F, etc., i.e. at this moment, the supplemental auxiliary information of the three-dimensional video sequence includes V pieces of supplemental auxiliary information sub-information in all. The composition of the supplemental auxiliary information of the three-dimensional video sequence has various combinations, may comprise A and comprise one of any combination of U-1 (when A indicates the case (a1) mentioned above, hereinafter inclusive) pieces of supplemental auxiliary information sub-information in two pieces of auxiliary sub-information comprising B, C, etc., or comprise A and comprise one of any combination of V-1 (when A indicates the case (a2) mentioned above, hereinafter inclusive) pieces of supplemental auxiliary information sub-information in five pieces of auxiliary sub-information comprising B, C, D, E, F, etc., for example:

Combination 1: when A indicates the case (a1), A, B, C (i.e. U=3); and when A indicates the case (a2), A, B, C, D, E, F (i.e. V=6).

Combination 2: when A indicates the case (a1), A, B, C; and when A indicates the case (a2), A, B, C, E, F.

Combination 3: when A indicates the case (a1), A, B, C; and when A indicates the case (a2), A, B, C, F.

Combination 4: when A indicates the case (a1), A, B; and when A indicates the case (a2), A, B, E, F.

Combination 5: when A indicates the case (a1), A, B; and when A indicates the case (a2), A, B, F.

Combination 6: when A indicates the case (a1), A; and when A indicates the case (a2), A, D, F.

Combination 7: when A indicates the case (a1), A; and when A indicates the case (a2), A, F.

Combination 8: when A indicates the case (a1), A, C; and when A indicates the case (a2), A, C, F.

Combination 9: when A indicates the case (a1), A, C; and when A indicates the case (a2), A, E.

Firstly, the supplemental auxiliary information of the three-dimensional video sequence corresponding to the three-dimensional video sequence bitstream is encoded as a supplemental auxiliary information bitstream, which comprises respectively numeralizing U or V pieces of supplemental auxiliary information sub-information as U or V syntax elements, and encoding the U or V syntax elements as the supplemental auxiliary information bitstream.

Then, the supplemental auxiliary information bitstream is written in the three-dimensional video sequence bitstream, thereby generating a three-dimensional video sequence bitstream containing the supplemental auxiliary information bitstream. The processing means of writing in the three-dimensional video sequence bitstream are various, and at least comprise one of the following processing means: means 1: a code word corresponding to a syntax element H1 indicating that the supplemental auxiliary information bitstream exists in the three-dimensional video sequence bitstream is written in the VUI (such as the vui_parameter( ) syntax unit in H.264/AVC standard), H1 containing two values of 0 and 1. If H1 is set as 1 (or 0), then the supplemental auxiliary information bitstream is wholly written in the VUI (located after the code word corresponding to H1). On the contrary, if H1 is set as 0 (or 1), the supplemental auxiliary information bitstream is not written in the VUI.

Means 2: a code word corresponding to a syntax element H2 indicating that the supplemental auxiliary information bitstream exists in the three-dimensional video sequence bitstream is written in the subset SPS (such as the subset_seq_parameter_set_rbsp( ) syntax unit in H.264/AVC standard), H2 containing two values of 0 and 1. If H2 is set as 1 (or 0), then the supplemental auxiliary information bitstream is wholly written in the subset SPS (located after the code word corresponding to H2). On the contrary, if H2 is set as 0 (or 1), the supplemental auxiliary information bitstream is not written in the subset SPS.

Means 3: the supplemental auxiliary information bitstream is wholly written in a mvc_vui_parameters_extension( ) syntax unit in the subset SPS.

Means 4: when A indicates the case (a1), the supplemental auxiliary information bitstream is divided into two parts, i.e. a bitstream 1 containing K (0<K<U, K being an integer) syntax elements mentioned above and a bitstream 2 containing the remaining U-K syntax elements mentioned above; the bitstream 1 is written in a certain syntax unit (e.g. subset SPS) in the three syntax units of VUI, SEI and subset SPS, and the bitstream 2 is written in another syntax unit (e.g. VUI) except the syntax unit where the bitstream 1 is located in the three syntax units of VUI, SEI and subset SPS; and when A indicates the case (a2), the supplemental auxiliary information bitstream is divided into 2 parts, i.e. a bitstream 1 containing J (0<J<V, J being an integer) syntax elements mentioned above and a bitstream 2 containing the remaining V-J syntax elements mentioned above; the bitstream 1 is written in a certain syntax unit (e.g. subset SPS) in VUI, SEI and subset SPS, and the bitstream 2 is written in another syntax unit (e.g. VUI) except the syntax unit where the bitstream 1 is located in VUI, SEI and subset SPS.

Preferred Embodiment 4

In this preferred embodiment, a method for decoding supplemental auxiliary information of a three-dimensional video sequence is involved. In this embodiment, supplemental auxiliary information of a three-dimensional video sequence corresponding to a supplemental auxiliary information bitstream of a three-dimensional video sequence bitstream comprises P ($1 \leq P \leq 6$, P being an integer) pieces of supplemental auxiliary information sub-information of 6 pieces of supplemental auxiliary information sub-information of synthesized view indication A, the position indication information of the view with minimum view order index being left view B, a number of shifting samples C, rendering precision D, indication information of the selection of the view with minimum view order index E, and position parameters of a synthesized view F, etc.; and the supplemental auxiliary information bitstream contains P syntax elements corresponding to the P pieces of supplemental auxiliary information sub-information.

Firstly, a supplemental auxiliary information bitstream is extracted from the three-dimensional video sequence bitstream. Then, the supplemental auxiliary information bitstream is decoded to obtain supplemental auxiliary information of a three-dimensional video sequence. For example, according to the precedence order and code word types of various syntax elements in the supplemental auxiliary information bitstream appointed by an encoding end and a decoding end, the supplemental auxiliary information bitstream is split into P codewords, and these code words are decoded to obtain P syntax elements, thereby recovering P pieces of supplemental auxiliary information sub-information, and obtaining supplemental auxiliary information of a three-dimensional video sequence constituted by the P pieces of supplemental auxiliary information sub-information.

Preferred Embodiment 5

In this preferred embodiment, a method for decoding supplemental auxiliary information of a three-dimensional video sequence is involved. In this embodiment, supplemental auxiliary information of a three-dimensional video sequence corresponding to a supplemental auxiliary information bitstream of a three-dimensional video sequence bitstream comprises P ($2 \leq P \leq 6$, P being an integer) pieces of supplemental auxiliary information sub-information of 6 pieces of supplemental auxiliary information sub-information of synthesized view indication A, the position indication information of the view with minimum view order index being left view B, a number of shifting samples C, rendering precision D, indication information of the selection of the view with minimum view order index E, and position parameters of a synthesized view F, etc. The supplemental auxiliary information bitstream contains Q syntax elements corresponding to the P pieces of supplemental auxiliary information sub-information, wherein there is at least one syntax element corresponding to a plurality of pieces (two or more than two) of supplemental auxiliary information sub-information. The length of the supplemental auxiliary information bitstream is R bits, where R is equal to the total sum of the lengths of code words corresponding to the Q syntax elements.

Firstly, a supplemental auxiliary information bitstream is extracted from a three-dimensional video sequence bitstream. The processing means thereof are various, and at least comprise one of the following processing means:

means 1: a syntax element H1 indicating that the supplemental auxiliary information bitstream exists in the three-dimensional video sequence bitstream is extracted from the VUI (such as the vui_parameter( ) syntax unit in H.264/AVC standard), H1 containing two values of 0 and 1. If H1 is 1 (or 0), R bits are read from the bitstream after a code word corresponding to H1 from the VUI, and the supplemental auxiliary information bitstream is extracted. On the contrary, if H1 is 0 (or 1), the supplemental auxiliary information bitstream is not extracted from the VUI bitstream.

Means 2: a syntax element H2 indicating that the supplemental auxiliary information bitstream exists in the three-dimensional video sequence bitstream is extracted from the subset SPS (such as the subset_seq_parameter_set_rbsp( ) syntax unit in H.264/AVC standard), H2 containing two values of 0 and 1. If H2 is 1 (or 0), R bits are read from the bitstream after a code word corresponding to H2 from the subset SPS, and the supplemental auxiliary information bitstream is extracted. On the contrary, if H2 is set as 0 (or 1), the supplemental auxiliary information bitstream is not extracted from the subset SPS.

Means 3: when Q is greater than 1, a first part of the supplemental auxiliary information bitstream is extracted from one (e.g. VUI) of the VUI, SEI and subset SPS, which contains K (0<K<Q, K being an integer) syntax elements mentioned above, and meanwhile, a second part of the supplemental auxiliary information bitstream is extracted from one of the remaining two (e.g. SEI) of the VUI, SEI and subset SPS, which contains the remaining Q-K (0<K<Q, K being an integer) syntax elements mentioned above.

Then, the supplemental auxiliary information bitstream is decoded to obtain supplemental auxiliary information of a three-dimensional video sequence.

Preferred Embodiment 6

In this preferred embodiment, a method for decoding supplemental auxiliary information of a three-dimensional video sequence is involved. In this embodiment, supplemental auxiliary information of a three-dimensional video sequence corresponding to a supplemental auxiliary information bitstream of a three-dimensional video sequence bitstream at least comprises synthesized view indication A. When the synthesized view indication A indicates the case (a1) mentioned above, the supplemental auxiliary information of the three-dimensional video sequence also contains U-1 ($1 \leq U \leq 3$, U being an integer) pieces of supplemental auxiliary information sub-information in two pieces of supplemental auxiliary information sub-information of position indication information of the view with minimum view order index being left view B and a number of shifting samples C, etc. At this moment, the supplemental auxiliary information bitstream contains U syntax elements corresponding to U pieces of supplemental auxiliary information sub-information, and the length of the supplemental auxiliary information bitstream is RU bits, wherein RU is equal to the total sum of the lengths of code words corresponding to the U syntax elements mentioned above. When the virtual view synthesis identification A indicates the case (a2) mentioned above, the supplemental auxiliary information of the three-dimensional video sequence also contains V−1 ($1 \leq V \leq 6$, V being an integer) pieces of supplemental auxiliary information sub-information in five pieces of supplemental auxiliary information sub-information of position indication information of the view with minimum view order index being left view B, a number of shifting samples C, rendering precision D, indication information of the selection of the view with minimum view order index E, and position parameters of a synthesized view F, etc. At this moment, the supplemental auxiliary information bitstream contains V syntax elements corresponding to the V pieces of supplemental auxiliary information sub-information, and the length of the supplemental auxiliary information bitstream is RV bits, wherein RV is equal to the total sum of the lengths of code words corresponding to the V syntax elements mentioned above.

Firstly, a supplemental auxiliary information bitstream is extracted from a three-dimensional video sequence bitstream. The processing means thereof are various, and at least comprise one of the following processing means:

means 1: the supplemental auxiliary information bitstream is extracted from one supplemental enhance information (SEI for short) message (such as a sei_message( ) syntax unit in H.264/AVC standard) in the SEI, the payloadType of the SEI message being a certain integer greater than 46 (e.g. 51 or 52), and the payloadSize being N bytes (e.g. 0<N<5, N being an integer). RU or RV bits are read from the SEI message, and the supplemental auxiliary information bitstream is extracted.

Means 2: RU or RV bits are read from the VUI (such as a vui_parameters( ) syntax unit in H.264/AVC standard), and the supplemental auxiliary information bitstream is extracted.

Means 3: RU or RV bits are read from the subset SPS (such as subset_seq_parameter_set_rbsp( ) syntax unit in H.264/AVC standard), and the supplemental auxiliary information bitstream is extracted.

Means 4: RU or RV bits are read from the mvc_vui_parameters_extension( ) syntax unit of the subset SPS, and the supplemental auxiliary information bitstream is extracted.

Then, the supplemental auxiliary information bitstream is decoded to obtain supplemental auxiliary information of a three-dimensional video sequence.

Preferred Embodiment 7

Figure 6:
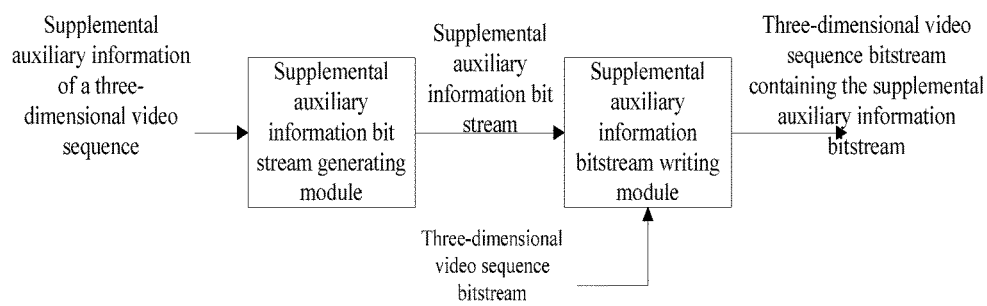
FIG. 6 is a structural schematic diagram of a device for encoding supplemental auxiliary information of a three-dimensional video sequence according to the embodiments of the present invention.

In this preferred embodiment, a device for encoding supplemental auxiliary information of a three-dimensional video sequence is involved. As shown in FIG. 6, it is a structural schematic diagram of an embodiment of a device for encoding supplemental auxiliary information of a three-dimensional video sequence. The device comprises two modules: a supplemental auxiliary information bitstream generating module and a supplemental auxiliary information bitstream writing module, wherein the supplemental auxiliary information bitstream generating module is used for encoding supplemental auxiliary information of a three-dimensional video sequence as a supplemental auxiliary information bitstream, and the supplemental auxiliary information bitstream writing module is used for writing the supplemental auxiliary information bitstream in a three-dimensional video sequence bitstream. The two modules are described in detail below.

1) The supplemental auxiliary information bitstream generating module, an input is the supplemental auxiliary information of a three-dimensional video sequence mentioned of, which contains one or more pieces of supplemental auxiliary information sub-information of 6 pieces of supplemental auxiliary information sub-information mentioned above, and an output is the supplemental auxiliary information bitstream mentioned above, the function accomplished by which and the implementation thereof are the same as the function and implementation of encoding supplemental auxiliary information of a three-dimensional video sequence corresponding to a three-dimensional video sequence bitstream as a supplemental auxiliary information bitstream in the method for encoding supplemental auxiliary information of a three-dimensional video sequence mentioned above.

2) The supplemental auxiliary information bitstream writing module, an input is the supplemental auxiliary information bitstream of the three-dimensional video sequence and a three-dimensional video sequence bitstream not containing the supplemental auxiliary information of the three-dimensional video sequence, and an output is a three-dimensional video sequence bitstream containing the supplemental auxiliary information bitstream of the three-dimensional video sequence mentioned above, the function accomplished by which and the implementation thereof are the same as the function and implementation of writing the supplemental auxiliary information bitstream in the three-dimensional video sequence bitstream in the method for encoding supplemental auxiliary information of a three-dimensional video sequence mentioned above.

Preferred Embodiment 8

Figure 7:
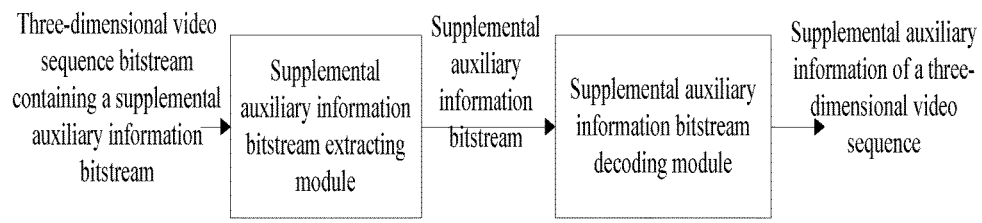
FIG. 7 is a structural schematic diagram of a device for decoding supplemental auxiliary information of a three-dimensional video sequence according to the embodiments of the present invention.

In this preferred embodiment, a device for decoding supplemental auxiliary information of a three-dimensional video sequence is involved. FIG. 7 is a structural schematic diagram of a device for decoding supplemental auxiliary information of a three-dimensional video sequence. The device comprises two modules: a supplemental auxiliary information bitstream extracting module and a supplemental auxiliary information bitstream decoding module, wherein the supplemental auxiliary information bitstream extracting module is configured to extracting a supplemental auxiliary information bitstream from a three-dimensional video sequence bitstream, and the supplemental auxiliary information bitstream decoding module is configured to decoding the supplemental auxiliary information bitstream to obtain supplemental auxiliary information of a three-dimensional video sequence. The two modules are described below.

1) The supplemental auxiliary information bitstream extracting module, an input is a three-dimensional video sequence bitstream containing a supplemental auxiliary information bitstream, and an output is the supplemental auxiliary information bitstream mentioned above, the function accomplished thereby and the implementation thereof are the same as the function and implementation of extracting a supplemental auxiliary information bitstream from a three-dimensional video sequence bitstream in the method for decoding supplemental auxiliary information of a three-dimensional video sequence mentioned above.

2) The supplemental auxiliary information bitstream decoding module, an input is the supplemental auxiliary information bitstream mentioned above, and an output is supplemental auxiliary information of a three-dimensional video sequence, which contains one or more pieces of the supplemental auxiliary information sub-information mentioned above, the function accomplished thereby and the implementation thereof are the same as the function and implementation of decoding the supplemental auxiliary information bitstream to obtain supplemental auxiliary information of a three-dimensional video sequence in the method for decoding supplemental auxiliary information of a three-dimensional video sequence mentioned above.

Preferably, the device for encoding and decoding supplemental auxiliary information of a three-dimensional video sequence mentioned above may be implemented by various means, for example:

method I: an electronic computer is hardware, attached with a software program with the same function as the method for encoding and decoding supplemental auxiliary information of a three-dimensional video sequence for implementation.

Method II: a single chip microcomputer is hardware, attached with a software program with the same function as the method for encoding and decoding supplemental auxiliary information of a three-dimensional video sequence for implementation.

Method III: a digital signal processor is hardware, attached with a software program with the same function as the method for encoding and decoding supplemental auxiliary information of a three-dimensional video sequence for implementation.

Method IV: a circuit with the same function as the method for encoding and decoding supplemental auxiliary information of a three-dimensional video sequence is designed for implementation.

It should be noted that there may also be other methods for implementing the device for encoding and decoding supplemental auxiliary information of a three-dimensional video sequence mentioned above, and are not limited to the four mentioned above.

Preferred Embodiment 9

In this preferred embodiment, a supplemental auxiliary information bitstream of a three-dimensional video sequence is involved. The supplemental auxiliary information bitstream contains P ($1 \leq P \leq 6$, P being an integer) pieces of supplemental auxiliary information sub-information of 6 pieces of supplemental auxiliary information sub-information of synthesized view indication A, the position indication information of the view with minimum view order index being left view B, a number of shifting samples C, rendering precision D, indication information of the selection of the view with minimum view order index E, and position parameters of a synthesized view F, etc., e.g. a combination of supplemental auxiliary information may comprise but is not limited to one of the following Combination 1: A;
Combination 2: B;
Combination 3: C;
Combination 4: D;
Combination 5: E;
Combination 6: F;
Combination 7: B, C;
Combination 8: A, F;
Combination 9: A, B, F;
Combination 10: A, B, C;
Combination 11: A, C, F;
Combination 12: A, B, E, F;
Combination 13: A, B, C, F;
Combination 14: B, C, E, F;
Combination 15: A, B, C, E, F;
Combination 16: A, B, C, D, E, F.

Preferably, the P pieces of supplemental auxiliary information sub-information mentioned above may be respectively numeralized as syntax elements alone, and code words corresponding to the P syntax elements form a supplemental auxiliary information bitstream. Or, the P pieces of supplemental auxiliary information sub-information may also be divided into Q (Q<P) groups, each group of supplemental auxiliary information sub-information being jointly numeralized as one syntax element; and code words corresponding to the Q syntax elements form a supplemental auxiliary information bitstream. The Q groups of information may have various composition forms, e.g. one of the following combinations:

Combination 1: {A, D}, {B}, {C} (i.e. P=4, Q=3, where A and D are one group, B is one group and C is one group, hereinafter inclusive);
Combination 2: {A, D}, {B, C, E, F};
Combination 3: {A, D}, {B}, {C}, {E}, {F};
Combination 4: {A, D}, {B}, {C}, {F};
Combination 5: {A, B}, C, {D, F, E};
Combination 6: {B, C};
Combination 7: {A, B, F}, {C}, {D}, {E};
Combination 8: {A, F}, {B}, {C}.

When the supplemental auxiliary information bitstream contains the synthesized view indication A, if A indicates the case (a1), the supplemental auxiliary information sub-information of D, E, F, etc. contained in the bitstream has no meaning.

The supplemental auxiliary information bitstream exists in the three-dimensional video sequence bitstream, at least comprising one of the following cases:

1) a part or all of the supplemental auxiliary information bitstream existing in supplemental enhancement information (SEI) of the three-dimensional video sequence bitstream;

2) a part or all of the supplemental auxiliary information bitstream existing in video usability information (VUI) of the three-dimensional video sequence bitstream; and 3) a part or all of the supplemental auxiliary information bitstream existing in subset sequence parameter set (subset SPS) of the three-dimensional video sequence bitstream.

Preferred Embodiment 10

In this preferred embodiment, a supplemental auxiliary information bitstream of a three-dimensional video sequence is involved. In this embodiment, supplemental auxiliary information of a three-dimensional video sequence corresponding to a supplemental auxiliary information bitstream of a three-dimensional video sequence bitstream at least comprises synthesized view indication A. When the synthesized view indication A indicates the case (a1) mentioned above, the supplemental auxiliary information of the three-dimensional video sequence also contains U−1 ($1 \leq U \leq 3$, U being an integer) pieces of supplemental auxiliary information sub-information in two pieces of supplemental auxiliary information sub-information of position indication information of the view with minimum view order index being left view B and a number of shifting samples C, etc.; and when the synthesized view indication A indicates the case (a2) mentioned above, the supplemental auxiliary information of the three-dimensional video sequence also contains V−1 ($1 \leq V \leq 6$, V being an integer) pieces of supplemental auxiliary information sub-information in five pieces of supplemental auxiliary information sub-information of position indication information of the view with minimum view order index being left view B, a number of shifting samples C, rendering precision D, indication information of the selection of the view with minimum view order index E, and position parameters of a synthesized view F, etc. The supplemental auxiliary information bitstream contains syntax elements corresponding to the U or V pieces of supplemental auxiliary information sub-information mentioned above. The combinations of the U pieces of supplemental auxiliary information sub-information are various, may comprise A and comprise one of any combination of U−1 pieces of supplemental auxiliary information sub-information of two pieces of supplemental auxiliary information sub-information of B, C, etc., and the combinations of the V pieces of supplemental auxiliary information sub-information are various, may comprise A and comprise one of any combination of V−1 pieces of supplemental auxiliary information sub-information of five pieces of supplemental auxiliary information sub-information of B, C, D, E, F, etc.

Combination 1: when A indicates the case (a1), A, B, C (i.e. U=3); and when A indicates the case (a2), A, B, C, D, E, F (i.e. V=6).

Combination 2: when A indicates the case (a1), A, B, C; and when A indicates the case (a2), A, B, C, E, F.

Combination 3: when A indicates the case (a1), A, B, C; and when A indicates the case (a2), A, B, C, D, F.

Combination 4: when A indicates the case (a1), A, B, C; and when A indicates the case (a2), A, B, C, F.

Combination 5: when A indicates the case (a1), A, B; and when A indicates the case (a2), A, B, E, F.

Combination 6: when A indicates the case (a1), A, B; and when A indicates the case (a2), A, B, F.

Combination 7: when A indicates the case (a1), A; and when A indicates the case (a2), A, D, F.

Combination 8: when A indicates the case (a1), A; and when A indicates the case (a2), A, F.

Combination 9: when A indicates the case (a1), A, C; and when A indicates the case (a2), A, C, F.

Combination 10: when A indicates the case (a1), A, C; and when A indicates the case (a2), A, F.

Combination 11: when A indicates the case (a1), A, C; and when A indicates the case (a2), A, D, F.

The supplemental auxiliary information bitstream mentioned above may exist in the VUI or subset SPS of the three-dimensional video sequence bitstream, and may also exist in the sequence parameter set syntax unit (such as seq_parameter_set_rbsp( ) in H.264/AVC standard) of the three-dimensional video sequence bitstream.

Meanwhile, the method for encoding and decoding supplemental auxiliary information of a three-dimensional video sequence, a corresponding device and bitstream provided by the embodiments of the present invention provide how to generate supplemental auxiliary information of a stereo-pair suitable for binocular stereoscopic viewing for a binocular stereoscopic display device of a decoding end, thereby achieving the technical effect of improving the final visual perception of three-dimensional stereoscopic displaying.

In another embodiment, software is also provided, the software being used for executing the technical solutions described in the embodiments and preferred embodiments mentioned above.

In another embodiment, a storage medium is also provided, the storage medium storing the software mentioned above, and the storage medium comprises but is not limited to: an optical disc, a floppy disk, a hard disk, an erasable memory, etc.

From the description above, it can be seen that the present invention implements the following technical effects: supplemental auxiliary information is carried in the three-dimensional video sequence bitstream, thereby enabling that these supplemental auxiliary information may be referred to when a stereo-pair is constructed from a reconstructed three-dimensional video sequence, enabling the display quality of the constructed stereo-pair to be better, thereby solving the technical problem in the prior art that degraded displaying quality of a constructed stereo-pair appears because of the lack of supplemental auxiliary information in a three-dimensional video sequence bitstream, and achieving the technical effect of improving the display quality of a constructed stereoscopic video.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any modification, equivalent replacement, or improvement made within the spirit and principle of the present invention shall all fall within the protection scope of the present invention.

What is claimed is:

1. A method for decoding supplemental auxiliary information of a three-dimensional video, comprising:
   obtaining supplemental auxiliary information for constructing a stereo-pair from a three-dimensional video bitstream;
   obtaining a reconstructed three-dimensional video sequence by decoding the three-dimensional video bitstream; and
   constructing the stereo-pair from the reconstructed three-dimensional video sequence according to the supplemental auxiliary information;
   wherein the supplemental auxiliary information comprises at least one of the following: synthesized view indication, position indication information of the view with minimum view order index, a number of shifting samples, rendering precision, indication information of the selection of the view with minimum view order index and position parameters of a synthesized view;
   wherein the synthesized view indication indicates whether the stereo-pair contains a video sequence of a synthesized view;
   wherein the position indication information of the view with minimum view order index indicates the left and/or right position of a video sequence in the video sequences of two views in the three-dimensional video sequence;

wherein the number of shifting samples indicates a number of horizontal shifted samples on a displayer performed for the video sequence images of two views in a stereo-pair, wherein the number of shifting samples is numeralized as a syntax element with its numerical value C', and C' is an integer and $0 \leq C' \leq 2^n-1$, wherein the C' being greater than or equal to an integer K represents that a left view image shifts C'-K samples to right with respect to a right view image, and being smaller than K represents that the left view image shifts K-C' samples to left with respect to the right view image, wherein $0 \leq K \leq 2^n-1$;

wherein the rendering precision indicates, when a stereo-pair contains a video sequence of a synthesized view, the rendering precision for synthesizing the video of the synthesized view;

wherein the indication information of the selection of the view with minimum view order index indicates, when the stereo-pair contains a synthesized view video sequence, which video sequence of the two video sequences with the minimum view order index and the secondary minimum view order index is used in constructing the stereo-pair with the synthesized view video; and wherein the position parameters of a synthesized view indicates, when the stereo-pair contains a synthesized view video sequence, the position of the synthesized view corresponding to the synthesized view video sequence on the straight line constituted by the two views in the three-dimensional video sequence with the minimum view order index and the secondary minimum view order index.

2. The method according to claim 1, wherein obtaining supplemental auxiliary information for constructing a stereo-pair from a three-dimensional video sequence bitstream comprises:

extracting supplemental auxiliary information bitstream from the three-dimensional video sequence bitstream; and decoding the supplemental auxiliary information bitstream to obtain the supplemental auxiliary information.

3. The method according to claim 1, wherein the supplemental auxiliary information is in at least one of the following information units of the three-dimensional video sequence bitstream: video usability information, supplemental enhancement information and subset sequence parameter set.

4. A method for encoding supplemental auxiliary information of a three-dimensional video sequence, comprising:

writing supplemental auxiliary information of a three-dimensional video sequence bitstream in a three-dimensional video sequence bitstream, wherein the supplemental auxiliary information indicates the construction of a stereo-pair from a reconstructed three-dimensional video sequence, wherein the reconstructed three-dimensional video sequence is obtained by decoding the three-dimensional video sequence bitstream;

wherein the supplemental auxiliary information comprises at least one of the following: synthesized view indication, position indication information of the view with minimum view order index, a number of shifting samples, rendering precision, indication information of the selection of the view with minimum view order index and position parameters of a synthesized view;

wherein the synthesized view indication indicates whether the stereo-pair contains a video sequence of a synthesized view;

wherein the position indication information of the view with minimum view order index indicates the left and/or right position of a video sequence in the video sequences of two views in the three-dimensional video sequence;

wherein the number of shifting samples indicates a number of horizontal shifted samples on a displayer performed for the video sequence images of two views in a stereo-pair, wherein the number of shifting samples is numeralized as a syntax element with its numerical value C', and C' is an integer and $0 \leq C' \leq 2^n-1$, wherein the C' being greater than or equal to an integer K represents that a left view image shifts C'-K samples to right with respect to a right view image, and being smaller than K represents that the left view image shifts K-C' samples to left with respect to the right view image, wherein $0 \leq K \leq 2^n-1$;

wherein the rendering precision indicates, when a stereo-pair contains a video sequence of a synthesized view, the rendering precision for synthesizing the video of the synthesized view;

wherein the indication information of the selection of the view with minimum view order index indicates, when the stereo-pair contains a synthesized view video sequence, which video sequence of the two video sequences with the minimum view order index and the secondary minimum view order index is used in constructing the stereo-pair with the synthesized view video; and wherein the position parameters of a synthesized view indicates, when the stereo-pair contains a synthesized view video sequence, the position of the synthesized view corresponding to the synthesized view video sequence on the straight line constituted by the two views in the three-dimensional video sequence with the minimum view order index and the secondary minimum view order index.

5. The method according to claim 4, wherein writing supplemental auxiliary information of a three-dimensional video sequence bitstream in a three-dimensional video sequence bitstream comprises:

encoding the supplemental auxiliary information as a supplemental auxiliary information bitstream; and writing the supplemental auxiliary information bitstream in the three-dimensional video sequence bitstream.

6. The method according to claim 4, wherein writing the supplemental auxiliary information in the three-dimensional video sequence bitstream comprises:

writing the supplemental auxiliary information in at least one of the following information units of the three-dimensional video sequence bitstream: video usability information, supplemental enhancement information and subset sequence parameter set.

7. A method for decoding supplemental auxiliary information of a three-dimensional video sequence, comprising:

obtaining a number of shifting samples from a three-dimensional video sequence bitstream, wherein the number of shifting samples indicates the number of horizontal shifted samples on a displayer which performs horizontal shifting on the pictures of the two views of a stereo-pair, wherein the number of shifting samples is numeralized as a syntax element with its numerical value C', and C' is an integer and $0 \leq C' \leq 2^n-1$, wherein the C' being greater than or equal to an integer K represents that a left view image shifts C'−K samples to right with respect to a right view image, and being smaller than K represents that the left view image shifts K−C' samples to left with respect to the right view image, wherein $0 \leq K \leq 2^n - 1$;

obtaining a reconstructed three-dimensional video sequence by decoding the three-dimensional video sequence bitstream; and constructing the stereo-pair from the reconstructed three-dimensional video sequence according to the number of shifting samples.

8. The method according to claim 7, wherein obtaining a number of shifting samples from a three-dimensional video sequence bitstream for indicating the number of horizontal shifted samples which performs horizontal shifting on the pictures of the two views of a stereo-pair constructed using the reconstructed three-dimensional video sequence comprises:

extracting supplemental auxiliary information bitstream carrying the number of shifting samples from the three-dimensional video sequence bitstream; and decoding the supplemental auxiliary information bitstream to obtain the number of shifting samples.

9. The method according to claim 7, wherein the number of shifting samples is in at least one of the following information units of the three-dimensional video sequence bitstream: video usability information, supplemental enhancement information and subset sequence parameter set.

10. A method for encoding supplemental auxiliary information of a three-dimensional video sequence, comprising:

writing a number of shifting samples in a three-dimensional video sequence bitstream, wherein the number of shifting samples indicates a number of shifting samples from a three-dimensional video sequence bitstream for indicating the number of horizontal shifted samples on a displayer which performs horizontal shifting on the pictures of the two views of a stereo-pair constructed using the reconstructed three-dimensional video sequence, wherein the reconstructed three-dimensional video sequence is obtained by decoding the three-dimensional video sequence bitstream, wherein the number of shifting samples is numeralized as a syntax element with its numerical value C', and C' is an integer and $0 \leq C' \leq 2^n - 1$, wherein the C' being greater than or equal to an integer K represents that a left view image shifts C'−K samples to right with respect to a right view image, and being smaller than K represents that the left view image shifts K−C' samples to left with respect to the right view image, wherein $0 \leq K \leq 2^n - 1$.

11. The method according to claim 10, wherein writing a number of shifting samples in the three-dimensional video sequence bitstream comprises:

encoding the number of shifting samples as supplemental auxiliary information bitstream; and writing the supplemental auxiliary information bitstream carrying the number of shifting samples in the three-dimensional video sequence bitstream.

12. The method according to claim 10, wherein writing the number of shifting samples in the three-dimensional video sequence bitstream comprises:

writing the number of shifting samples in at least one of the following information units of the three-dimensional video sequence bitstream: video usability information, supplemental enhancement information and subset sequence parameter set.

13. A device for decoding supplemental auxiliary information of a three-dimensional video sequence, comprising a hardware processor and a memory, wherein the hardware processor is configured to execute program units stored in the memory, and the program units comprise:

a supplemental auxiliary information obtaining unit, configured to obtain supplemental auxiliary information for constructing a stereo-pair from a three-dimensional video sequence bitstream, wherein the supplemental auxiliary information indicates the construction of the stereo-pair from a reconstructed three-dimensional video sequence, wherein the reconstructed three-dimensional video sequence is obtained by decoding the three-dimensional video sequence bitstream;

wherein the supplemental auxiliary information comprises at least one of the following: synthesized view indication, position indication information of the view with minimum view order index, a number of shifting samples, rendering precision, indication information of the selection of the view with minimum view order index and position parameters of a synthesized view;

wherein the synthesized view indication indicates whether the stereo-pair contains a video sequence of a synthesized view;

wherein the position indication information of the view with minimum view order index indicates the left and/or right position of a video sequence in the video sequences of two views in the three-dimensional video sequence;

wherein the number of shifting samples indicates a number of horizontal shifted samples on a displayer performed for the video sequence images of two views in a stereo-pair, wherein the number of shifting samples is numeralized as a syntax element with its numerical value C', and C' is an integer and $0 \leq C' \leq 2^n - 1$, wherein the C' being greater than or equal to an integer K represents that a left view image shifts C'−K samples to right with respect to a right view image, and being smaller than K represents that the left view image shifts K−C' samples to left with respect to the right view image, wherein $0 \leq K \leq 2^n - 1$;

wherein the rendering precision indicates, when a stereo-pair contains a video sequence of a synthesized view, the rendering precision for synthesizing the video of the synthesized view;

wherein the indication information of the selection of the view with minimum view order index indicates, when the stereo-pair contains a synthesized view video sequence, which video sequence of the two video sequences with the minimum view order index and the secondary minimum view order index is used in constructing the stereo-pair with the synthesized view video; and wherein the position parameters of a synthesized view indicates, when the stereo-pair contains a synthesized view video sequence, the position of the synthesized view corresponding to the synthesized view video sequence on the straight line constituted by the two views in the three-dimensional video sequence with the minimum view order index and the secondary minimum view order index.

14. The device according to claim 13, wherein the supplemental auxiliary information obtaining unit comprises:

a supplemental auxiliary information bitstream extracting module, configured to extract supplemental auxiliary information bitstream from the three-dimensional video sequence bitstream; and a supplemental auxiliary information bitstream decoding module, configured to decode the supplemental auxiliary information bitstream to obtain the supplemental auxiliary information.

15. A device for encoding supplemental auxiliary information of a three-dimensional video sequence, comprising a hardware processor and a memory, wherein the hardware processor is configured to execute program units stored in the memory, and the program units comprise:
   a supplemental auxiliary information writing unit, configured to write supplemental auxiliary information of a three-dimensional video sequence bitstream in a three-dimensional video sequence bitstream, wherein the supplemental auxiliary information indicates the construction of the stereo-pair from a reconstructed three-dimensional video sequence, wherein the reconstructed three-dimensional video sequence is obtained by decoding the three-dimensional video sequence bitstream;
   wherein the supplemental auxiliary information comprises at least one of the following: synthesized view indication, position indication information of the view with minimum view order index, a number of shifting samples, rendering precision, indication information of the selection of the view with minimum view order index and position parameters of a synthesized view;
   wherein the synthesized view indication indicates whether the stereo-pair contains a video sequence of a synthesized view;
   wherein the position indication information of the view with minimum view order index indicates the left and/or right position of a video sequence in the video sequences of two views in the three-dimensional video sequence;
   wherein the number of shifting samples indicates a number of horizontal shifted samples on a displayer performed for the video sequence images of two views in a stereo-pair, wherein the number of shifting samples is numeralized as a syntax element with its numerical value C', and C' is an integer and $0 \leq C' \leq 2^n - 1$, wherein the C' being greater than or equal to an integer K represents that a left view image shifts C'−K samples to right with respect to a right view image, and being smaller than K represents that the left view image shifts K−C' samples to left with respect to the right view image, wherein $0 \leq K \leq 2^n - 1$;
   wherein the rendering precision indicates, when a stereo-pair contains a video sequence of a synthesized view, the rendering precision for synthesizing the video of the synthesized view;
   wherein the indication information of the selection of the view with minimum view order index indicates, when the stereo-pair contains a synthesized view video sequence, which video sequence of the two video sequences with the minimum view order index and the secondary minimum view order index is used in constructing the stereo-pair with the synthesized view video; and
   wherein the position parameters of a synthesized view indicates, when the stereo-pair contains a synthesized view video sequence, the position of the synthesized view corresponding to the synthesized view video sequence on the straight line constituted by the two views in the three-dimensional video sequence with the minimum view order index and the secondary minimum view order index.

16. The device according to claim 15, wherein the supplemental auxiliary information writing unit comprises:
   a supplemental auxiliary information bitstream generating module, configured to encode the supplemental auxiliary information as supplemental auxiliary information bitstream; and
   a supplemental auxiliary information bitstream writing module, configured to write the supplemental auxiliary information bitstream in the three-dimensional video sequence bitstream.

17. A device for decoding supplemental auxiliary information of a three-dimensional video sequence, comprising a hardware processor and a memory, wherein the hardware processor is configured to execute program units stored in the memory, and the program units comprise:
   a supplemental auxiliary information obtaining unit, configured to obtain a number of shifting samples from a three-dimensional video sequence bitstream for indicating the number of horizontal shifted samples on a displayer which performs horizontal shifting on the pictures of the two views of a stereo-pair constructed using the reconstructed three-dimensional video sequence, wherein the reconstructed three-dimensional video sequence is obtained by decoding the three-dimensional video sequence bitstream, wherein the number of shifting samples is numeralized as a syntax element with its numerical value C', and C' is an integer and $0 \leq C' \leq 2^n - 1$, wherein the C' being greater than or equal to an integer K represents that a left view image shifts C'−K samples to right with respect to a right view image, and being smaller than K represents that the left view image shifts K−C' samples to left with respect to the right view image, wherein $0 \leq K \leq 2^n - 1$.

18. The device according to claim 17, wherein the supplemental auxiliary information obtaining unit comprises:
   a supplemental auxiliary information bitstream extracting module, configured to extract supplemental auxiliary information bitstream carrying the number of shifting samples from the three-dimensional video sequence bitstream; and
   a supplemental auxiliary information bitstream decoding module, configured to decode the supplemental auxiliary information bitstream to obtain the number of shifting samples.

19. A device for encoding supplemental auxiliary information of a three-dimensional video sequence, comprising a hardware processor and a memory, wherein the hardware processor is configured to execute program units stored in the memory, and the program units comprise:
   a supplemental auxiliary information writing unit, configured to write a number of shifting samples in the three-dimensional video sequence bitstream, wherein the number of shifting samples indicates the number of horizontal shifted samples on a displayer which performs horizontal shifting on the pictures of the two views of a stereo-pair constructed using the reconstructed three-dimensional video sequence, wherein the reconstructed three-dimensional video sequence is obtained by decoding the three-dimensional video sequence bitstream, wherein the number of shifting samples is numeralized as a syntax element with its numerical value C', and C' is an integer and $0 \leq C' \leq 2^n - 1$, wherein the C' being greater than or equal to an integer K represents that a left view image shifts C'−K samples to right with respect to a right view image, and being smaller than K represents that the left view image shifts K–C' samples to left with respect to the right view image, wherein $0 \leq K \leq 2^n - 1$.

20. The device according to claim 19, wherein the supplemental auxiliary information writing unit comprises:
   a supplemental auxiliary information bitstream generating module, configured to encode the number of shifting samples as supplemental auxiliary information bitstream; and
   a supplemental auxiliary information bitstream writing module, configured to write the supplemental auxiliary information bitstream carrying the number of shifting samples in the three-dimensional video sequence bitstream.

21. A method for encoding supplemental auxiliary information of a three-dimensional video sequence, comprising:
   encoding supplemental auxiliary information of a three-dimensional video sequence corresponding to a three-dimensional video sequence bitstream as a supplemental auxiliary information bitstream, and writing the supplemental auxiliary information bitstream in the three-dimensional video sequence bitstream, wherein the supplemental auxiliary information of a three-dimensional video sequence indicates processing of generating a stereo-pair from a reconstructed three-dimensional video sequence, and comprises at least one of the following information:
      the synthesized view indication, for indicating one of the following two cases: the stereo-pair being a stereo-pair formed as two video sequences with the minimum view order index and the secondary minimum view order index in the three-dimensional video sequence; or the stereo-pair being a stereo-pair formed as one of the two video sequences with the minimum view order index and the secondary minimum view order index in the three-dimensional video sequence and a synthesized video sequence;
      the position indication information of the view with minimum view order index being left view, for identifying whether the view with the minimum view order index in the three-dimensional video sequence is on the left of the view with the secondary minimum view order index in the three-dimensional video sequence;
      the number of shifting samples, for indicating a number of horizontal shifted samples on a displayer performed for the video sequence images of two views in a stereo-pair, wherein the number of shifting samples is numeralized as a syntax element with its numerical value C', and C' is an integer and $0 \leq C' \leq 2^n - 1$, wherein the C' being greater than or equal to an integer K represents that a left view image shifts C'–K samples to right with respect to a right view image, and being smaller than K represents that the left view image shifts K–C' samples to left with respect to the right view image, wherein $0 \leq K \leq 2^n - 1$;
      the rendering precision, for indicating, when a stereo-pair contains a video sequence of a synthesized view, the rendering precision for synthesizing the video of the synthesized view;
      the indication information of the selection of the view with minimum view order index, for indicating, when the stereo-pair contains a synthesized view video sequence, which video sequence of the two video sequences with the minimum view order index and the secondary minimum view order index is used in constructing the stereo-pair with the synthesized view video;
      the position parameters of a synthesized view, for indicating, when the stereo-pair contains a synthesized view video sequence, the position of the synthesized view corresponding to the synthesized view video sequence on the straight line constituted by the two views in the three-dimensional video sequence with the minimum view order index and the secondary minimum view order index.

22. The method according to claim 21, wherein the supplemental auxiliary information bitstream is written in the three-dimensional video sequence bitstream using one of the following means:
   writing the information in the supplemental auxiliary information bitstream into supplemental enhancement information of the three-dimensional video sequence bitstream;
   writing the information in the supplemental auxiliary information bitstream into video usability information of the three-dimensional video sequence bitstream; or
   writing the information in the supplemental auxiliary information bitstream into subset sequence parameter set of the three-dimensional video sequence bitstream.

23. A method for decoding supplemental auxiliary information of a three-dimensional video sequence, comprising:
   extracting a supplemental auxiliary information bitstream from a three-dimensional video sequence bitstream, and decoding the supplemental auxiliary information bitstream to obtain supplemental auxiliary information of a three-dimensional video sequence, wherein the supplemental auxiliary information of a three-dimensional video sequence indicates processing of generating a stereo-pair from a reconstructed three-dimensional video sequence, and comprises at least one of the following information:
      the synthesized view indication, for indicating one of the following two cases: the stereo-pair being a stereo-pair formed as two video sequences with the minimum view order index and the secondary minimum view order index in the three-dimensional video sequence; or the stereo-pair being a stereo-pair formed as one of the two video sequences with the minimum view order index and the secondary minimum view order index in the three-dimensional video sequence and a synthesized video sequence;
      the position indication information of the view with minimum view order index being left view, for identifying whether the view with the minimum view order index in the three-dimensional video sequence is on the left of the view with the secondary minimum view order index in the three-dimensional video sequence;
      the number of shifting samples, for indicating a number of horizontal shifted samples on a displayer performed for the video sequence images of two views in a stereo-pair, wherein the number of shifting samples is numeralized as a syntax element with its numerical value C', and C' is an integer and $0 \leq C' \leq 2^n - 1$, wherein the C' being greater than or equal to an integer K represents that a left view image shifts C'–K samples to right with respect to a right view image, and being smaller than K represents that the left view image shifts K–C' samples to left with respect to the right view image, wherein $0 \leq K \leq 2^n - 1$;

the rendering precision, for indicating, when a stereo-pair contains a video sequence of a synthesized view, the rendering precision for synthesizing the video of the synthesized view;

the indication information of the selection of the view with minimum view order index, for indicating, when the stereo-pair contains a synthesized view video sequence, which video sequence of the two video sequences with the minimum view order index and the secondary minimum view order index is used in constructing the stereo-pair with the synthesized view video;

the position parameters of a synthesized view, for indicating, when the stereo-pair contains a synthesized view video sequence, the position of the synthesized view corresponding to the synthesized view video sequence on the straight line constituted by the two views in the three-dimensional video sequence with the minimum view order index and the secondary minimum view order index.

24. The method according to claim 23, wherein the supplemental auxiliary information bitstream is extracted from the three-dimensional video sequence bitstream using one of the following means:
  obtaining the information of the supplemental auxiliary information bitstream from supplemental enhancement information of the three-dimensional video sequence bitstream;
  obtaining the information of the supplemental auxiliary information bitstream from video usability information of the three-dimensional video sequence bitstream;
  obtaining the information of the supplemental auxiliary information bitstream from subset sequence parameter set of the three-dimensional video sequence bitstream.

25. A device for encoding supplemental auxiliary information of a three-dimensional video sequence, comprising a hardware processor and a memory, wherein the hardware processor is configured to execute program modules stored in the memory, and the program modules comprise:
  a supplemental auxiliary information bitstream generating module, configured to encode supplemental auxiliary information of a three-dimensional video sequence corresponding to a three-dimensional video sequence bitstream as a supplemental auxiliary information bitstream, wherein an input of the supplemental auxiliary information bitstream generating module is supplemental auxiliary information of a three-dimensional video sequence, and an output is a supplemental auxiliary information bitstream; and
  a supplemental auxiliary information bitstream writing module, configured to write the supplemental auxiliary information bitstream in a three-dimensional video sequence bitstream, wherein an input of the supplemental auxiliary information bitstream writing module is the supplemental auxiliary information bitstream and the three-dimensional video sequence bitstream, and an output is a three-dimensional video sequence bitstream containing the supplemental auxiliary information bitstream;
  wherein the supplemental auxiliary information of a three-dimensional video sequence indicates processing of generating a stereo-pair from a reconstructed three-dimensional video sequence, wherein the supplemental auxiliary information of a three-dimensional video sequence comprises at least one of the following information:

the synthesized view indication, for indicating one of the following two cases: the stereo-pair being a stereo-pair formed as two video sequences with the minimum view order index and the secondary minimum view order index in the three-dimensional video sequence; or the stereo-pair being a stereo-pair formed as one of the two video sequences with the minimum view order index and the secondary minimum view order index in the three-dimensional video sequence and a synthesized video sequence;

the position indication information of the view with minimum view order index being left view, for identifying whether the view with the minimum view order index in the three-dimensional video sequence is on the left of the view with the secondary minimum view order index in the three-dimensional video sequence;

the number of shifting samples, for indicating a number of horizontal shifted samples on a displayer performed for the video sequence images of two views in a stereo-pair, wherein the number of shifting samples is numeralized as a syntax element with its numerical value C', and C' is an integer and $0 \leq C' \leq 2^n-1$, wherein the C' being greater than or equal to an integer K represents that a left view image shifts C'−K samples to right with respect to a right view image, and being smaller than K represents that the left view image shifts K−C' samples to left with respect to the right view image, wherein $0 \leq K \leq 2^n-1$;

the rendering precision, for indicating, when a stereo-pair contains a video sequence of a synthesized view, the rendering precision for synthesizing the video of the synthesized view;

the indication information of the selection of the view with minimum view order index, for indicating, when the stereo-pair contains a synthesized view video sequence, which video sequence of the two video sequences with the minimum view order index and the secondary minimum view order index is used in constructing the stereo-pair with the synthesized view video;

the position parameters of a synthesized view, for indicating, when the stereo-pair contains a synthesized view video sequence, the position of the synthesized view corresponding to the synthesized view video sequence on the straight line constituted by the two views in the three-dimensional video sequence with the minimum view order index and the secondary minimum view order index.

26. The device according to claim 25, wherein the supplemental auxiliary information bitstream writing module is further configured to write the supplemental auxiliary information bitstream in a three-dimensional video sequence bitstream using at least one of the following means:
  writing the information in the supplemental auxiliary information bitstream into supplemental enhancement information of the three-dimensional video sequence bitstream;
  writing the information in the supplemental auxiliary information bitstream into video usability information of the three-dimensional video sequence bitstream; or
  writing the information in the supplemental auxiliary information bitstream into subset sequence parameter set of the three-dimensional video sequence bitstream.

27. A device for decoding supplemental auxiliary information of a three-dimensional video sequence, comprising a hardware processor and a memory, wherein the hardware processor is configured to execute program modules stored in the memory, and the program modules comprise:
- a supplemental auxiliary information bitstream extracting module, configured to extract a supplemental auxiliary information bitstream from a three-dimensional video sequence bitstream, wherein an input of the supplemental auxiliary information bitstream extracting module is a three-dimensional video sequence bitstream, and an output is the supplemental auxiliary information bitstream; and
- a supplemental auxiliary information bitstream decoding module, configured to decode the supplemental auxiliary information bitstream to obtain supplemental auxiliary information of a three-dimensional video sequence, wherein an input of the supplemental auxiliary information bitstream decoding module is the supplemental auxiliary information bitstream, and an output is the supplemental auxiliary information of a three-dimensional video sequence, wherein the supplemental auxiliary information of a three-dimensional video sequence indicates processing of generating a stereo-pair from a reconstructed three-dimensional video sequence, and comprises at least one of the following information:
  - the synthesized view indication, for indicating one of the following two cases: the stereo-pair being a stereo-pair formed as two video sequences with the minimum view order index and the secondary minimum view order index in the three-dimensional video sequence; or the stereo-pair being a stereo-pair formed as one of the two video sequences with the minimum view order index and the secondary minimum view order index in the three-dimensional video sequence and a synthesized video sequence;
  - the position indication information of the view with minimum view order index being left view, for identifying whether the view with the minimum view order index in the three-dimensional video sequence is on the left of the view with the secondary minimum view order index in the three-dimensional video sequence;
  - the number of shifting samples, for indicating a number of horizontal shifted samples on a displayer performed for the video sequence images of two views in a stereo-pair, wherein the number of shifting samples is numeralized as a syntax element with its numerical value C', and C' is an integer and $0 \leq C' \leq 2^n-1$, wherein the C' being greater than or equal to an integer K represents that a left view image shifts C'−K samples to right with respect to a right view image, and being smaller than K represents that the left view image shifts K−C' samples to left with respect to the right view image, wherein $0 \leq K \leq 2^n-1$;
  - the rendering precision, for indicating, when a stereo-pair contains a video sequence of a synthesized view, the rendering precision for synthesizing the video of the synthesized view;
  - the indication information of the selection of the view with minimum view order index, for indicating, when the stereo-pair contains a synthesized view video sequence, which video sequence of the two video sequences with the minimum view order index and the secondary minimum view order index is used in constructing the stereo-pair with the synthesized view video;
  - the position parameters of a synthesized view, for indicating, when the stereo-pair contains a synthesized view video sequence, the position of the synthesized view corresponding to the synthesized view video sequence on the straight line constituted by the two views in the three-dimensional video sequence with the minimum view order index and the secondary minimum view order index.

28. The device according to claim 27, wherein the supplemental auxiliary information bitstream extracting module is further configured to extract a supplemental auxiliary information bitstream from a three-dimensional video sequence bitstream using at least one of the following means:
- obtaining the information of the supplemental auxiliary information bitstream from supplemental enhancement information of the three-dimensional video sequence bitstream;
- obtaining the information of the supplemental auxiliary information bitstream from video usability information of the three-dimensional video sequence bitstream; or
- obtaining the information of the supplemental auxiliary information bitstream from subset sequence parameter set of the three-dimensional video sequence bitstream.

* * * * *